US011216291B1

(12) United States Patent
Dhanabal et al.

(10) Patent No.: US 11,216,291 B1
(45) Date of Patent: Jan. 4, 2022

(54) VIRTUAL AUTOMATED REAL-TIME ASSISTANT

(71) Applicant: AMERICAN AIRLINES, INC., Fort Worth, TX (US)

(72) Inventors: Arunprakash Dhanabal, Flower Mound, TX (US); Mrugesh Bhatt, Coppell, TX (US)

(73) Assignee: AMERICAN AIRLINES, INC., Fort Worth, TX (US)

(*) Notice: Subject to any disclaimer, the term of this patent is extended or adjusted under 35 U.S.C. 154(b) by 410 days.

(21) Appl. No.: 16/261,197

(22) Filed: Jan. 29, 2019

(51) Int. Cl.
*G06F 9/451* (2018.01)
*H04L 29/06* (2006.01)
*G06F 3/0484* (2013.01)

(52) U.S. Cl.
CPC .............. *G06F 9/453* (2018.02); *H04L 63/08* (2013.01); *H04L 63/102* (2013.01); *H04L 63/105* (2013.01); *G06F 3/04842* (2013.01)

(58) Field of Classification Search
CPC ...................................................... G06F 9/453
See application file for complete search history.

(56) References Cited

U.S. PATENT DOCUMENTS

| 10,405,146 | B1* | 9/2019 | Kuruvilla et al. | .... H04W 4/029 |
| 2016/0132812 | A1* | 5/2016 | Beasley et al. | ........ G06Q 10/06 |
| 2018/0225365 | A1* | 8/2018 | Altaf et al. | ....... G06F 17/30675 |
| 2019/0173811 | A1* | 6/2019 | Estrada et al. | .......... H04L 51/02 |

* cited by examiner

*Primary Examiner* — James J Debrow
(74) *Attorney, Agent, or Firm* — Haynes and Boone, LLP

(57) ABSTRACT

A method that includes: receiving, by a processor(s), a user identifier and an authentication identifier that are associated with a user of a computer gaining direct access to information within a first application; displaying, on a GUI of the computer, a first window associated with the first application; displaying, on the GUI and simultaneously with the first window, a second window associated with a second application to initiate a chat session; after displaying the first and second windows, receiving by the processor(s), a user input associated with an information request; identifying, using the processor(s) and the second application, contextual inputs associated with the session and/or the user; accessing, using the processor(s) and the second application, a third application; identifying, using the processor(s) and the second application, information relevant to the information request within the third application; and displaying a response to the first information request in the second window.

20 Claims, 36 Drawing Sheets

```
JS Sendtobot.js    x 4  var intentResolver = require('./intentResolver.js');
 5  var actionConstants = require('./actionConstants.js');
 6  var DbConfig = require('../database/DBQueriesConfig.js').DbConfig;
 7  var logger = require('./logger.js').logger;
 8  var formatResponse = require('./formatResponse.js');
 9
10  /* GET api listing. */
11  router.post('/sendtobot', (req, res) => {
12      intentResolver.invokeAPI(req, function(apiResponse){
13          if(apiResponse.error === true){
14              //send error message
15              formatResponse.formatResponse(res, apiRespoonse);
16          }
17          else{
18              var flag = false;
19              for(var i = 0;i < actionConstants.length;++i){
20                  if(apiResponse.action == "" || apiResponse.action == actionConstants[i]){
21                      flag = true;
22                      break;
23                  }
24              }
25              if(flag === true){
26                  //if the user query is small talk, greetings etc.
27                  logger.info("API response is sent back to the user");
28                  formatResponse.formatResponse(res, apiResponse);
29              }
```

Explorer
- Open Editors
- Varta Basic
  - Node_Modules
  - Server
    - API
    - JS Netwok.js
    - JS Options.js
    - JS ActionConstants.js
    - JS FormatResponse.js
    - JS GetAPIResponse.js
    - JS IntentResolver.js
    - JS Logger.js
    - JS Sendtobot.js
    - JS TransformUIResponse.js
  - SRC
    - App
      - Config
        - TS App.config.ts
      - Service
        - TS Get-data.service.sp...
        - TS Get-data.service.ts
      - Views
        - App.component.html

| User Input | Expected Response | Source of Data or Service Endpoint |
|---|---|---|
| What are the delayed flights from DFW | Delayed flight list | Sixth or Fifth Application |
| Is there a baggage embargo to XXX station? | Likely need response set up for each station. Would like to know in response: A) Is there an embargo: Yes/No B) What are the restrictions of this embargo: Example - Passenger limited to one bag, embargo in effect 4/7/17-10/7/17, etc | 8th Application |
| Does a minor traveling to Mexico need a notarized letter if not traveling with their parents to check-in for the flight? | Yes; (link to Timatic page) | Timatic |
| How many passengers have yet to Check-in for flight no-2489? | For flight No: 2489,48 passengers have yet to check-in | csmanifest - retrivePassengerList |
| What are the canceled flights from my station? | The following flights are canceled: Flight 1234 to ORD at 1230 - canceled Flight 233 to SFO at 1250 - canceled Flight 3456 to MSN at 1255 - canceled | event type cancel from 5th application |
| How many free bags are allowed for Elite Passengers? | Gold- 1 Bag Platinum- 2 Bags etc. | 8th Application |
| For how many bags does Gate service fee is applicable for BE Passengers during Gate Check bag? | First two checked bags | 8th Application |
| What is the weight restriction for a bag going to Brazil? | Brazil weight restriction is 70lbs or 32kg per bag | 8th Application |
| Can I do check-in for Selected Passenger? | You can only check-in a selectee on seventh application if using a Sabre Network BP printer (Mobile printer will deny check-in) | 8th Application |

FIG. 29

| User Input | Expected Response | Source of Data or Service Endpoint |
|---|---|---|
| Why am I missing a flight? | Check your profile settings to ensure that the flight you are missing falls within your profile criteria. 2nd application only displays flights that are arriving or departing withing your profile criteria. | 2nd Application |
| How can I turn off an alert? | Click on the settings sprocket displayed next to the station name (top left of the screen). Inside that profile section navigate to the Event/Alert tab. Uncheck the events you do not wish to be alerted on. Click Apply. | 2nd Application |
| How do I add notes to a flight? | From Gantt: Click on the flight puck to access the Flight Details page. Under the Event/Notes section, click the Notes tab. Enter the note information in the text box and then click Submit.<br>From Flight List: Click the settings sprocket located on at the end of the flight list line for the flight you wish to add a note on. Click Add Note. Click into the textbox and add the information you wish to enter. Click Submit.<br>Important: You will see your note immediately in your session. 2nd application users may take up to 2 minutes to see the note. | 2nd Application |
| 2nd Application is not updating, what do I do? | First ensure that there are no network issues. Confirm that other applications that you are using are working properly and updating as expected. If the issue is isolated to 2nd application, locate the data indicator displayed top right of your screen (Next to your name) Click on the data indicator then click Refresh. If this does not resolve the issue, signout of 2nd application and log back in. If the problem persists contact the ITHD at 480-XXX-XXXX to report the issue. If the problem is affecting multiple users please advise the ITHD of the same. | 2nd Application |

| User Input | Expected Response | Source of Data or Service Endpoint |
|---|---|---|
| Why are some tail numbers and gates shown in bold font? | On the flight list tail numbers and gates are shown in bold if the tail or gate number changed within 90 minutes of arrival of that flight to your station. Click on the tail or gate will display the history of the tail or gate changes. | 2nd Application |
| How do I setup 2nd application to only monitor certain zones or airlines? | Click on the settings sprocket displayed next to the station name (top left of the screen). Inside that profile section navigate to the Station/Zone tab to select the zone you wish to monitor. Navigate to the Advanced tab to select the airlines you wish to monitor. Then click Apply. | 2nd Application |
| Is there a way to see the aircraft swaps and gate changes that have occurred on a flight? | Yes, use the swap report icon located in the global header. This report displays all aircraft and gate changes that have occurred on flights that match the users profile settings. | 2nd Application |
| The application does not seem to be working, how do I get help? | Please contact the ITHD at 480-XXX-XXXX. | 2nd Application |
| Can I split a puck? | No, currently 2nd Application splits and connects pucks based on internal logic. In the future this capability will be added. | 2nd Application |
| What is the difference between a flight note and a tail note? | A flight note stays attached with the flight regardless of the tail number assigned to it. A tail note stays assigned to the tail regardless of the flight it is assigned to. The tail note will only be displayed on the next scheduled departure for that tail and only at the station that entered the note. | 2nd Application |

| Chat Query | Expected Response | Source of Data or Service Endpoint |
|---|---|---|
| How many reroutes on AA 1234? | There are X reroutes for AA 1234 to ORD | DV8 |
| Bag tag Ba262621 | This bag belongs to customer John Doe with a final destination of LHR. Currently the bag has been last seen in DFW bag room at location BR-MU-3 | 1st Application |
| What is the PNR for <bag tag> | The PNR is XXXAAA | 1st Application |
| How many reroutes in the last 24 hours? | There have been X reroutes in the last 24 hours for DFW of which only X have been completed | DV8 |
| PNR ABCDEF | Customer Doe/John has 2 checked bags and is scheduled for AA 1232 to MIA. This bag needs to be rerouted to AA 2873 to MIA. It is currently last seen dropped off for transfer at gate D23 | 1st Application |
| What is the WT number of <bag tag> | The World Tracer number is DFWAA123456 | DV8 |
| What is the NT # for <bag tag> | The NetTracer number is CLEAA123456 | 1st Application |
| What is the pax status for <bag tag> | The passenger is currently on board <flight> | 1st Application |
| What is the location of <bag tag> | The bag is currently in JFK Terminal 8 at Pier 4 | 1st Application |
| What are the flight options for <bag tag> | Here are the flights to JFK for bag tag 400123928: <Flight Options> | DV8 |

FIG. 31

| Chat Query | Expected Response | Source of Data or Service Endpoint |
|---|---|---|
| How many connections on AA 1234? | There are X number of connections from inbound AA 1234 from ORD. The shortest connect time is X mins to AA 7890 to Houston at Gate X | 3rd Application |
| Where is AA 1234? | Inbound AA 1234 is currently over Omaha, NE with an estimated arrival time of 1530 into Dallas Fort Worth | 5th Application |
| How many late connections do I have in the next hour? | There are X number of bags with connection times less than 30 minutes over the next hour | 3rd Application |
| How many flights are on the ground but not yet parked? | There are X number of planes that have Landed but not yet arrived at the gates. The longest airplane on the ground is AA 1234 from CLE which has been out there for X mins | 3rd Application |
| PNR ABCDEF | Customer Doe/John has 2 checked bags and is scheduled for AA 1232 to MIA | 1st Application |
| How many missconnects in the next hour? | There will be X bags that will missconnect with the most from inbound AA 222 from ELP arriving at 1700 at gate 42B | 3rd Application |
| Customer John Doe | John Doe...PNR XXXAAA has 18 checked bags and has a final destination of RDM. Customers flight itinerary is: AA 9999 DFW-LAX departing at 1200 at Gate 43, AA 7777 LAX-SEA departing at 1430 local time in LAX, AS 2321 SEA-RDM departing at 1823 local time in SEA | 1st Application |
| Bag tag Ba262621 | This bag belongs to customer John Doe with a final destination of LHR. Currently the bag has been last seen in DFW bag room at location BR-MU-3 | 1st Aapplication |
| How many overrides do I have today? | There have been X bags that have been overridden by fleet service clerks today in DFW | 1st Application |
| How many bags have been flagged as DNL? | There have been X bags flagged by users in Bag Security | 3rd Application |

| Chat Query | Expected Response | Source of Data or Service Endpoint |
|---|---|---|
| Can I put a Class (#) and a Class (#) Dangerous Good in the same compartment | You can/Cannot put a Class(#) and a Class(#) Dangerous Good in the same compartment | DG Charts |
| Has passenger "NAME" Boarded the flight yet? | Passenger "Name" Is or Is not oboard Flight (FLT#) | 1st Application |
| What is my next arrival at gate "Gate Number" | Your next arrival is flight (Flt#) at (Arrival Time) from (Destination) | 5th Application |
| How many bags are planned for flight (Flt#) | You have (# bags) planned for your flight | 1st Application |
| What is the arrival claim belt for flight (Flt #) | The arrival claim is claim (Claim #) | 5th Application |
| What is the Maximum animal points allowance for (Compartment #) on a (Aircraft Type) | The maximum animal points is (#points) points in the (Compartment #) Compartment or Animal are not allowed in this compartment | DG Charts |
| Can I load Dry Ice in the (Compartment #) of a (Aircraft Type) | You can/Cannot load dry ice in the (Compartment #) compartment | DG Charts |
| What is my current and max weight in (Compartment #) Compartment | Your Current Weight in (Compartment #) Compartment is (#) and you Maximum weight in (Compartment #) Compartment is | Ramplink |
| Where are the (BL, BP, BO, BX, BE, BC, or BI) Bags on inbound flight (#) | The (BL, BP, BO, BX, BE, BC, or BI) bags are loaded in the (Compartment #) on flight (#) from (Origin station) | 1st Application |
| Where is the last scan location for bag (#) | The last scan location for bag (#) is (Location) | 1st Application |

FIG. 33

| Chat Query | Expected Response | Source of Data or Service Endpoint |
|---|---|---|
| What gate is #### coming to? | C24 | 6th/5th Application |
| How many bags are coming off? | 125 | 1st Application |
| How many local bags are coming off? | 42 | 1st Application |
| What bin are BO's in? | AFT Bin | 1st Application |
| When will flight #### arrive? | Landing at 14:20 | 6th/5th Application |
| How many bags have I delivered | 100 | Tlink |
| Show me gate changes for flight #### | C24, D5, A11 | 3rd Application |
| How many stops do I have? | 5 stops | Tlink |
| How long will my run take? | 43 minutes | Tlink |
| How many concierge key bags are on my flight? | There are 2 bags on your flight. | 4th Application |

FIG. 34

VIRTUAL AUTOMATED REAL-TIME ASSISTANT

BACKGROUND

Generally, business entities store information across multiple applications and operating systems which access a variety of databases. For complex business entities, the volume of information and the variety of databases in which the information is stored is so large that accessing the information is burdensome or impossible. For example, airline carriers are responsible for planning and pricing routes, handling and tracking luggage, maintaining the aircraft, preparing the aircraft for use, managing gate availability, and staffing the flights with appropriate personnel, among many other tasks. Thus, information associated with the tasks is spread among multiple databases that are accessible via multiple applications. For example, the airline carrier's policy regarding whether a minor, which is traveling to Mexico without his or her parents, needs a notarized letter before the minor can check in to a flight, is determined by an association which posts this information on its website. Meanwhile, information regarding baggage tracking is provided by a baggage tracking system that is accessible via a specific bag tracking application. While both pieces of information are available online, or at least electrically accessible via a network, to access each requires an employee to know the location at which it is available. An employee of an airline carrier may need to know the policy regarding unaccompanied minors flying to Mexico at one minute and need to know the location of the customer's baggage at the next. This requires the employee to identify the appropriate applications or database and then find the relevant information.

Moreover, business entities, such as airline carriers, often provide a customer-facing website and/or mobile application for its customers. These websites and/or mobile applications provide information relating to the business entity and customer-specific information. In some instances, a customer can login via a network to a customer-specific account to view their upcoming travel, reservations, etc. Customers face challenges similar to the employees, in that a customer must know the area to look for specific information.

Conventional searching tools generally return a listing of options to the user (e.g., customer, employee) for their review and selection. For example, if a user does a field search, then they will receive multiple links to documents that might be relevant. The user is then required to know which document is correct, or click on every document and review each, to find the relevant information. That is, the burden of finding information is on the user.

Moreover, conventional searching tools generally search within one application. If the user is active in a first application and needs information from a second application, the user is generally required to open the second application and then perform a search within the second application. Alternatively, the information could be added to the first application, but that process requires the ingestion of the information by the first application and the development of new features within the first application, which is slow and creates potential problems with accuracy of information across applications.

BRIEF DESCRIPTION OF THE DRAWINGS

FIG. 9 is screenshot displaying a plurality of instructions, according to an example embodiment.

FIG. 10 is another screenshot displaying another plurality of instructions, according to an example embodiment.

FIG. 11 is another screenshot displaying another plurality of instructions, according to an example embodiment.

FIG. 12 is another screenshot displaying another plurality of instructions, according to an example embodiment.

FIG. 14 is another screenshot displaying another plurality of instructions, according to an example embodiment.

FIG. 15 is another screenshot displaying another plurality of instructions, according to an example embodiment.

FIG. 16 is another screenshot displaying another plurality of instructions, according to an example embodiment.

FIG. 17 is another screenshot displaying another plurality of instructions, according to an example embodiment.

FIG. 18 is another screenshot displaying another plurality of instructions, according to an example embodiment.

FIG. 19 is another screenshot displaying another plurality of instructions, according to an example embodiment.

FIG. 20 is another screenshot displaying another plurality of instructions, according to an example embodiment.

FIG. 22 is another screenshot displaying another plurality of instructions, according to an example embodiment.

FIG. 24 is another screenshot displaying another plurality of instructions, according to an example embodiment.

FIG. 25 is another screenshot displaying another plurality of instructions, according to an example embodiment.

FIG. 29 is a table that includes example user inputs, expected responses, and sources of data or service input, according to an example embodiment.

FIGS. 30A and 30B together form another table that includes example user inputs, expected responses, and sources of data or service endpoints, according to an example embodiment.

FIG. 31 is another table that includes example user inputs, expected responses, and sources of data or service endpoints, according to an example embodiment.

FIG. 32 is another table that includes example user inputs, expected responses, and sources of data or service endpoints, according to an example embodiment.

FIG. 33 is another table that includes example user inputs, expected responses, and sources of data or service endpoints, according to an example embodiment.

FIG. 34 is another table that includes example user inputs, expected responses, and sources of data or service endpoints, according to an example embodiment.

DETAILED DESCRIPTION

Figure 1:
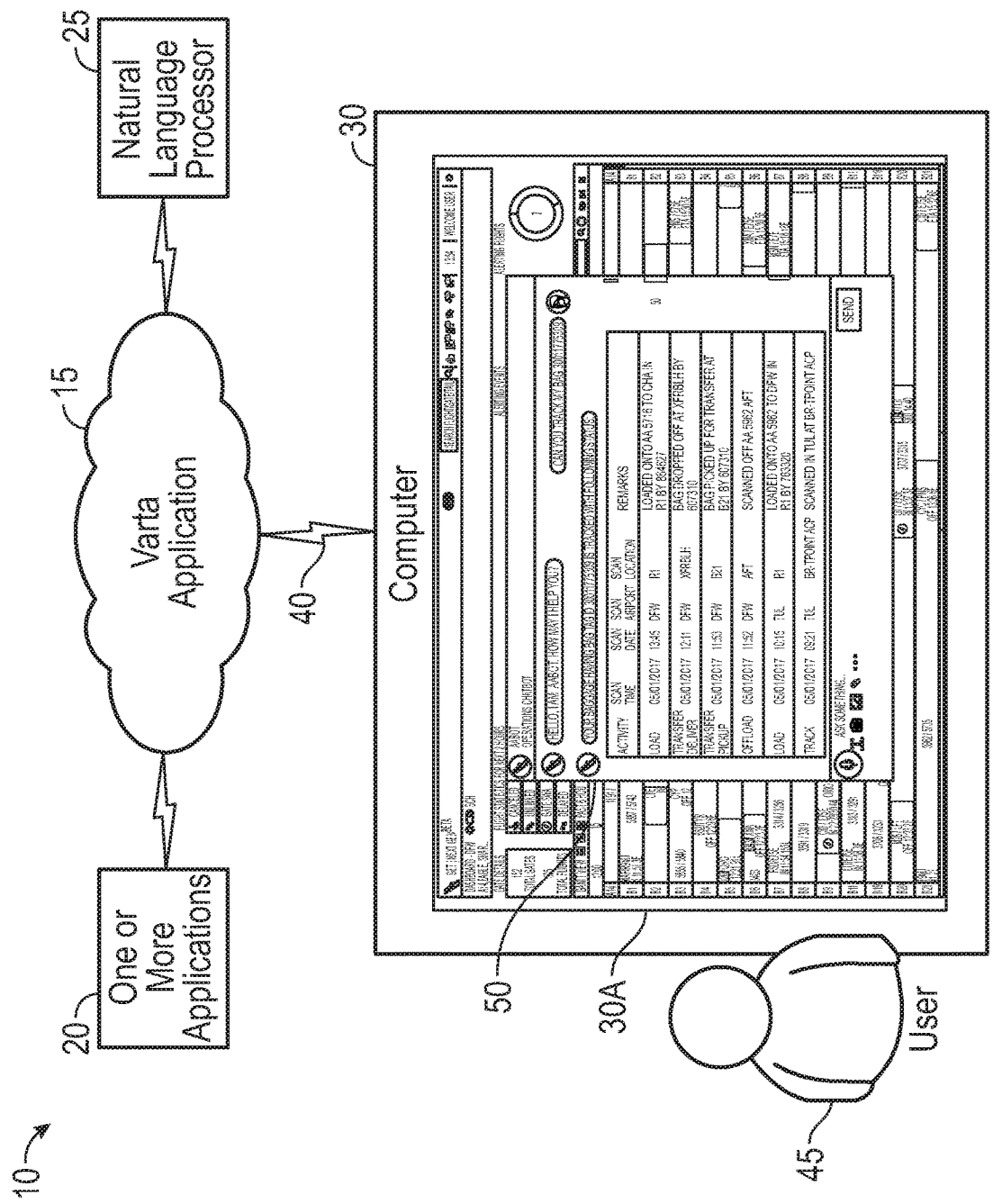
FIG. 1 is a diagrammatic illustration of a system that includes a VARTA application, one or more applications, a natural language processor, and a computer having a graphical user interface configured to display a plurality of windows, according to an example embodiment.

In an example embodiment, referring to FIG. 1, a system 10 includes a Virtual Automated Real-time Assistant application ("VARTA") 15; one or more applications 20; a natural language processor ("NLP") 25 (company developer, in-house developed, or 3rd party integration); and a computer 30 on which a graphical user interface ("GUI") 30a is displayed, all of which are operably connected via a network 40. Generally, VARTA 15 is configured to present a window 50 on the GUI 30a of the computer 30 to initiate a chat session with a user 45 of the computer 30.

In an example embodiment, VARTA 15 is a virtual automated real-time assistant to the user 45 of the computer 30 and aids the user 45 in accessing information within any one of the one or more applications 20 without leaving the application in which the user 45 is working. Moreover, in response to a query from the user 45, VARTA 15 retrieves the information to provide an answer to the query in addition to providing the supporting document or citation. VARTA 15 retrieves the information in multiple ways, for example searching through files (e.g., WebRef) stored within the one or more applications 20; calling API end point exposed to VARTA 15 by one or more applications 20; and retrieving information from one or more databases. That is, VARTA 15 does not merely provide a listing of potentially relevant sources for the user 45 to review, but instead finds the answer within the documents and presents the answer to the user 45. Moreover, VARTA 15 determines, based on the information being presented to the user 45, the type of format in which to present the information to the user 45. For example, if the information would be best presented in a table format, then VARTA 15 determines that the information should be presented in a table format and formats the data as a table for display to the user 45. Graphs, charts, images, text, audio, etc. are other formats in which the information can be displayed. For example, VARTA 15 can read text to the user 45 if necessary. VARTA 15 can receive input from the user 45 in a variety of methods, for example the user 45 entering text as a query, clicking on a selectable link displayed on the window 50 or on the GUI 30a, and by using voice to text functionality. Moreover, VARTA 15 is capable of operating across the one or more applications 20. Specifically, a chat session can be initiated from each of the one or more applications 20. In some embodiments, the look and feel of the chat session can mimic the look and feel of the application from which the session was initiated. Generally, when a chat session is initiated within one application using VARTA 15, VARTA 15 recognizes the data being viewed or that has been viewed by the user 45 in the one application and uses that data as contextual input when responding to the query of the user 45. Thus, VARTA 15 is context aware and recognizes the application/tool that is being used and within which VARTA 15 has been executed. For example, when the user 45 is viewing a specific flight and then asks about a crew or personnel position, VARTA 15 uses the flight being viewed as context input for the query of the user 45. VARTA 15 also uses contextual inputs identified when the user 45 logs into the system 10 (e.g., the role, location, etc. of the user 45). Using VARTA 15, the experience of the user 45 is streamlined and the business process involving the user 45 is improved. The function of the computer 30 is also improved, as VARTA 15 performs the searching on a processor that is separate and remote from a processor associated with the computer 30. The computer 30 merely displays the result, which requires much less processing load than the computer 30 needing to open multiple applications and load multiple files for the user 45 to review.

Figure 2:
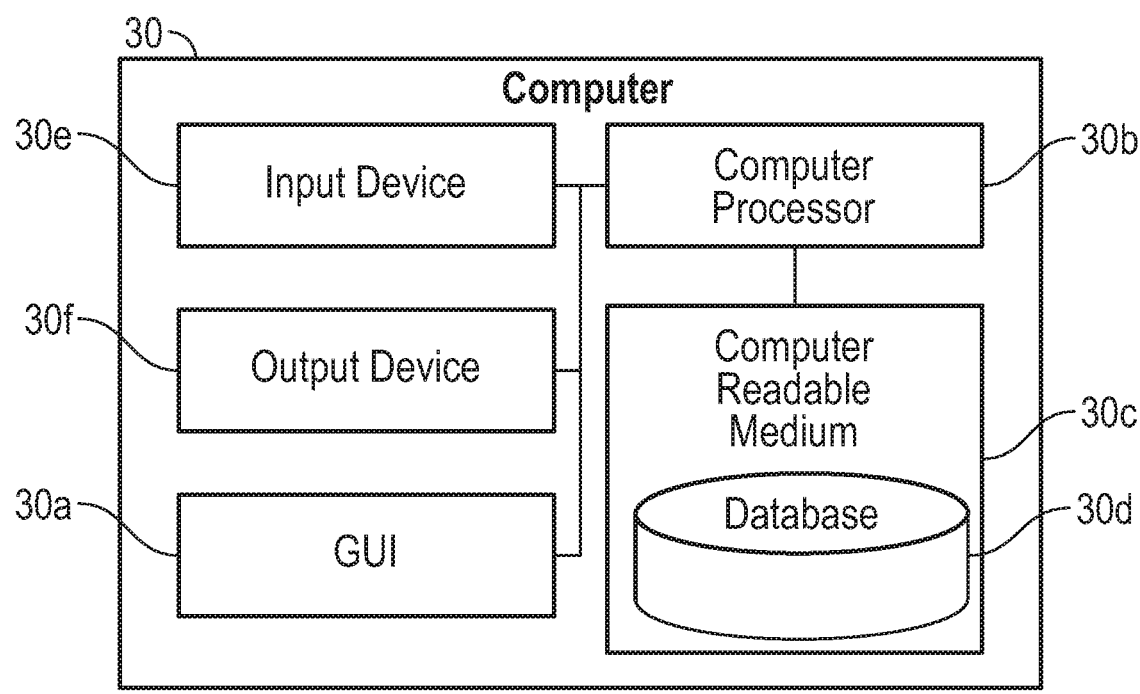
FIG. 2 is a diagrammatic illustration of the computer of FIG. 1, according to an example embodiment.

In an example embodiment, as illustrated in FIG. 2 with continuing reference to FIG. 1, the computer 30 includes the GUI 30a, computer processor 30b and a computer readable medium 30c operably coupled thereto. Instructions accessible to, and executable by, the computer processor 30b are stored on the computer readable medium 30c. A database 30d is also stored in the computer readable medium 30c. Generally, the GUI 30a is capable of displaying a plurality of windows or screens to the user 45. The computer 30 also includes an input device 30e and an output device 30f. In some embodiments, the input device 30e and the output device 30f are the GUI 30a. In some embodiments, the user 45 provides inputs to the system 10 via the window 50 that is displayed on the GUI 30a. However, the input device 30e is a microphone in some embodiments and the output device 30f is a speaker. In several example embodiments, the computer 30 is, or includes, a telephone, a personal computer, a personal digital assistant, a cellular telephone or mobile phone, other types of telecommunications devices, other types of computing devices, and/or any combination thereof. In several example embodiments, the computer 30 includes a plurality of remote user devices.

Figure 3:
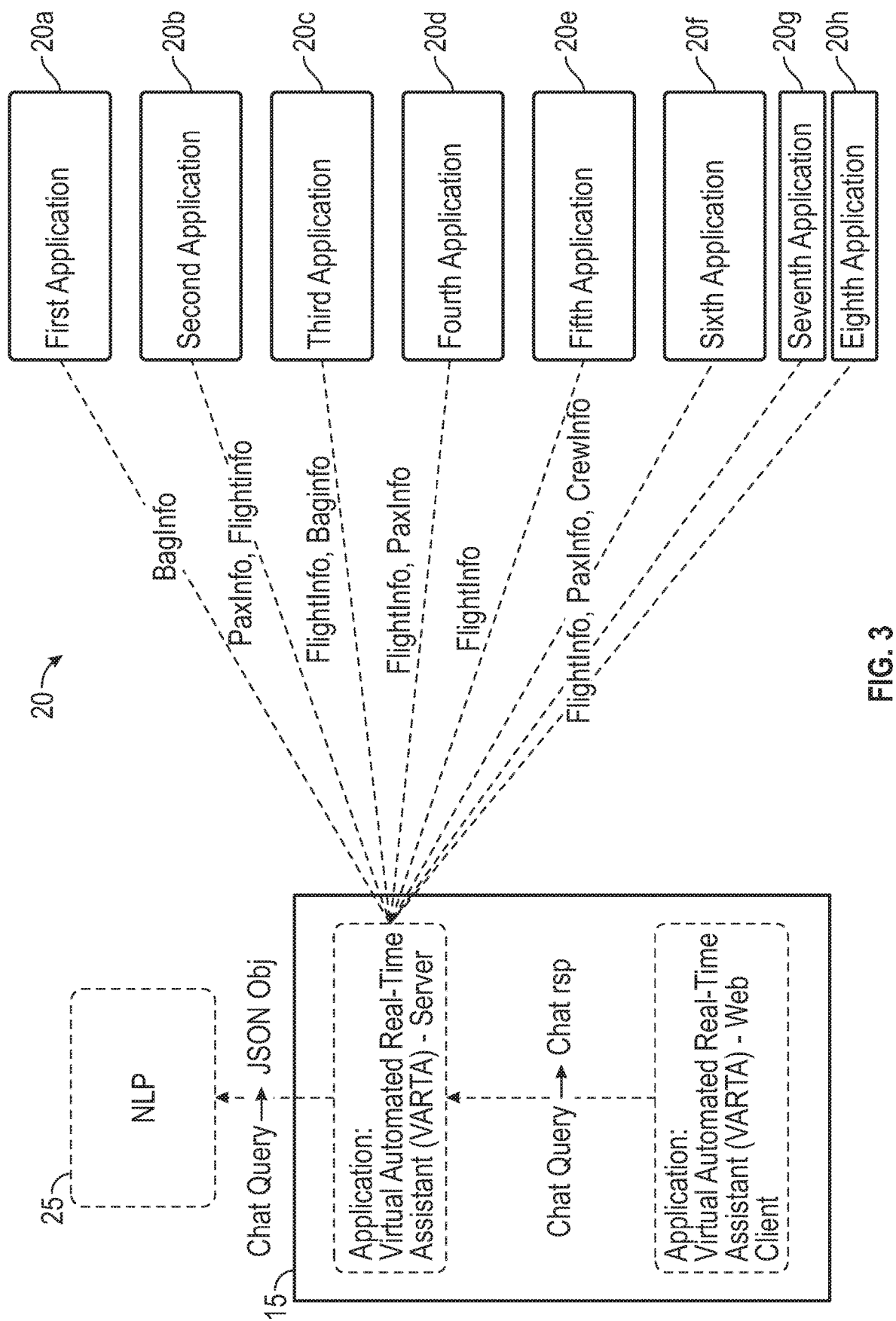
FIG. 3 is a data flow illustration between the natural language processor, the VARTA application, and the one or more applications, according to an example embodiment.

In an example embodiment, and as illustrated in FIG. 3, VARTA 15 is in communication with the NLP 25 and the one or more applications 20. In some embodiments, the one or more applications 20 include a first application 20a; a second application 20b; a third application 20c; a fourth application 20d; a fifth application 20e; and a sixth application 20f; a seventh application 20g; and an eighth application 20h, among others. In an example embodiment, each of the applications 20a-20h are stored in a computer similar to the computer 30 in that it includes a processor, computer readable medium, and a database. In some embodiments, each of the applications 20a-20h access information from a data source that forms a portion of the one or more applications 20. However, in other embodiments, one or more of the applications 20a-20h access information from a data source that is separate from and apart from the applications 20a-20h. In some embodiments, more than one application accesses information from one data source.

In an example embodiment, the NLP 25 enables a text interface where the user 45 enters search query in natural language, and, based on the user input, the NLP 25 identifies an intent and one or more entities. Generally, the intent is the intention of the user 45 and an entity is a user parameter. Generally, each intent is mapped to a source of the response from VARTA 15. Examples of entities are dates, times, names, places, and more. For example, if the user input is "book a flight from Delhi to Frankfurt", then "book" is the intent and "Delhi" and "Frankfurt" are entities. In some embodiments, the NLP 25 is Api.ai or DialogFlow by Google. However, in some embodiments the NLP 25 is IBM Watson, Microsoft Botframework, or LUIS.ai.

Figure 4:
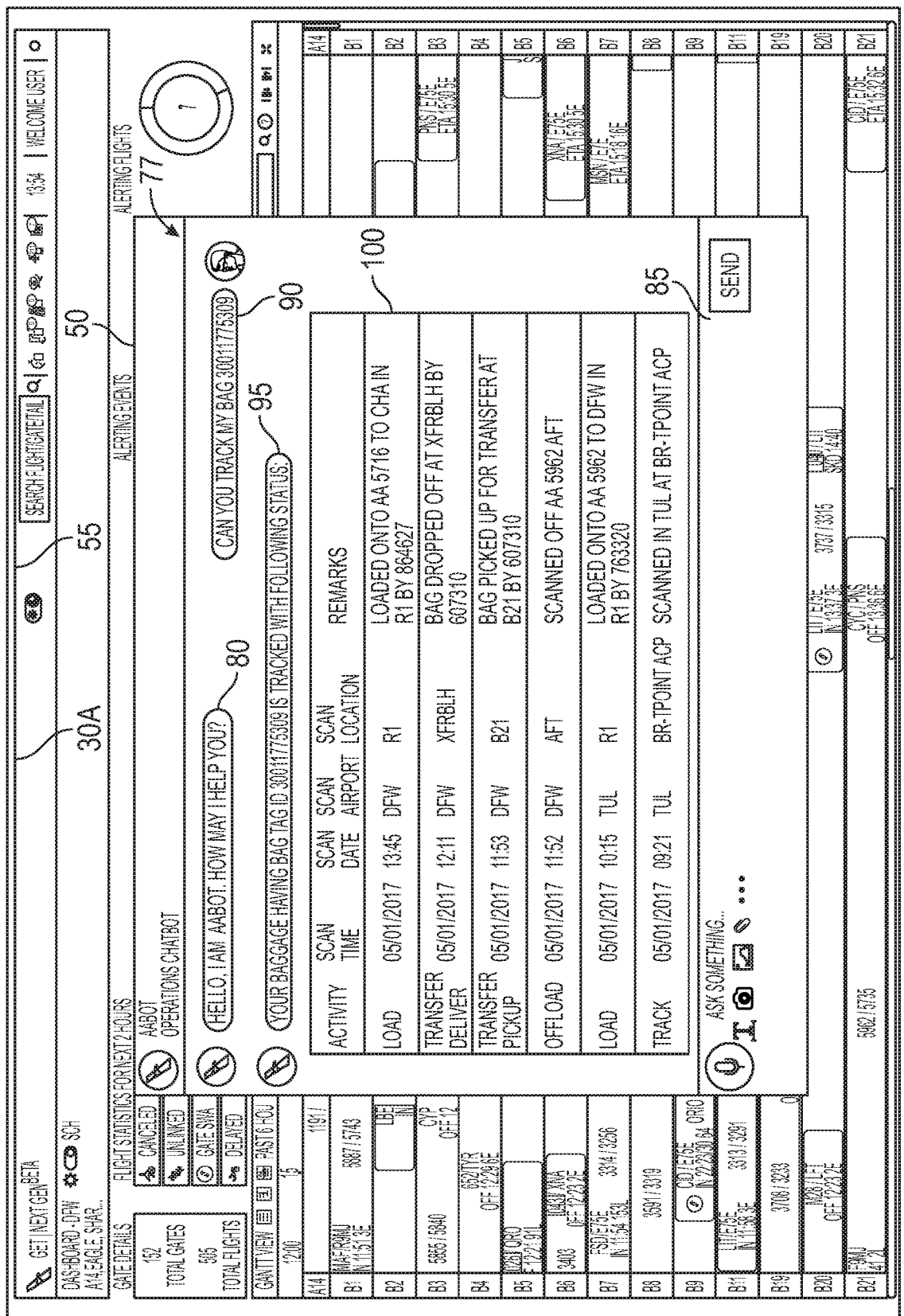
FIG. 4 is an illustration of the first and second window displayed by the graphical user interface of FIG. 1, according to an example embodiment.

FIG. 4 illustrates the computer 30, the GUI 30*a*, a window 55 that is displayed on the GUI 30*a* and that is associated with a first application within the one or more applications 20, and the window 50 displayed on the GUI 30*a* that is associated with VARTA 15. In this example, the window 55 is associated with the second application 20*b*. In this example, the window 55 illustrates a Gannt chart view of gate availability. The second application 20*b* generally manages gate availability and provides the user 45 with details regarding the incoming flight number and outgoing flight number for turns of each aircraft at the respective gates over time, among other details relating to gate activity. Upon activation of VARTA 15 by the user 45, the window 50 is displayed over or near the window 55 to initiate a chat session 77. Upon activation, VARTA 15 displays an introduction message via a dialogue box 80. The user provides an input via an input box 85. In some instances, VARTA 15 receives a query when the user 45 enters text into an input box 85 using a keyboard coupled to, or displayed on, the computer 30, and then submits the entered text. However, in some embodiments, VARTA 15 can receive the user input via a microphone (to be used in a voice recognition module), etc. Moreover, in some instances, the user input can include a document, picture, or other item that is loadable/identifiable via the input box 85.

In this example, the user 45 provides an input of "can you track my bag 3001175309" which forms dialogue box 90 in the chat session 77. Data relating to bag tracking is generally not managed or accessible via the second application 20*b*. Instead, bag tracking is accessible via the first application 20*a* and its source data. Regardless, VARTA 15 searches across the one or more applications 20 to determine that the first application 20*a*, which is one of one or more applications 20, manages baggage data. Not only does VARTA 15 identify the application that manages/presents the requested data, but VARTA 15 finds the user-requested data within the data source associated with the first application 20*a*. That is, VARTA 15 displays the data to the user 45 via the dialogue box 95 by providing the following text: "your baggage having bag tag id 3001175309 is tracked with following status" and displaying a portion of a table 100 that provides tracking data for the requested bag tag id. In some embodiments, VARTA 15 determines, after reviewing the requested data but before presenting it to the user 45, that the preferred format in which to present the data is a format that is different from the format in which the data is stored in the relevant application (i.e., the application in which the requested data was stored). In this case, VARTA 15 configures the data to the preferred format and then displays the data in the preferred format to the user 45 via the chat session 77.

Figure 5:
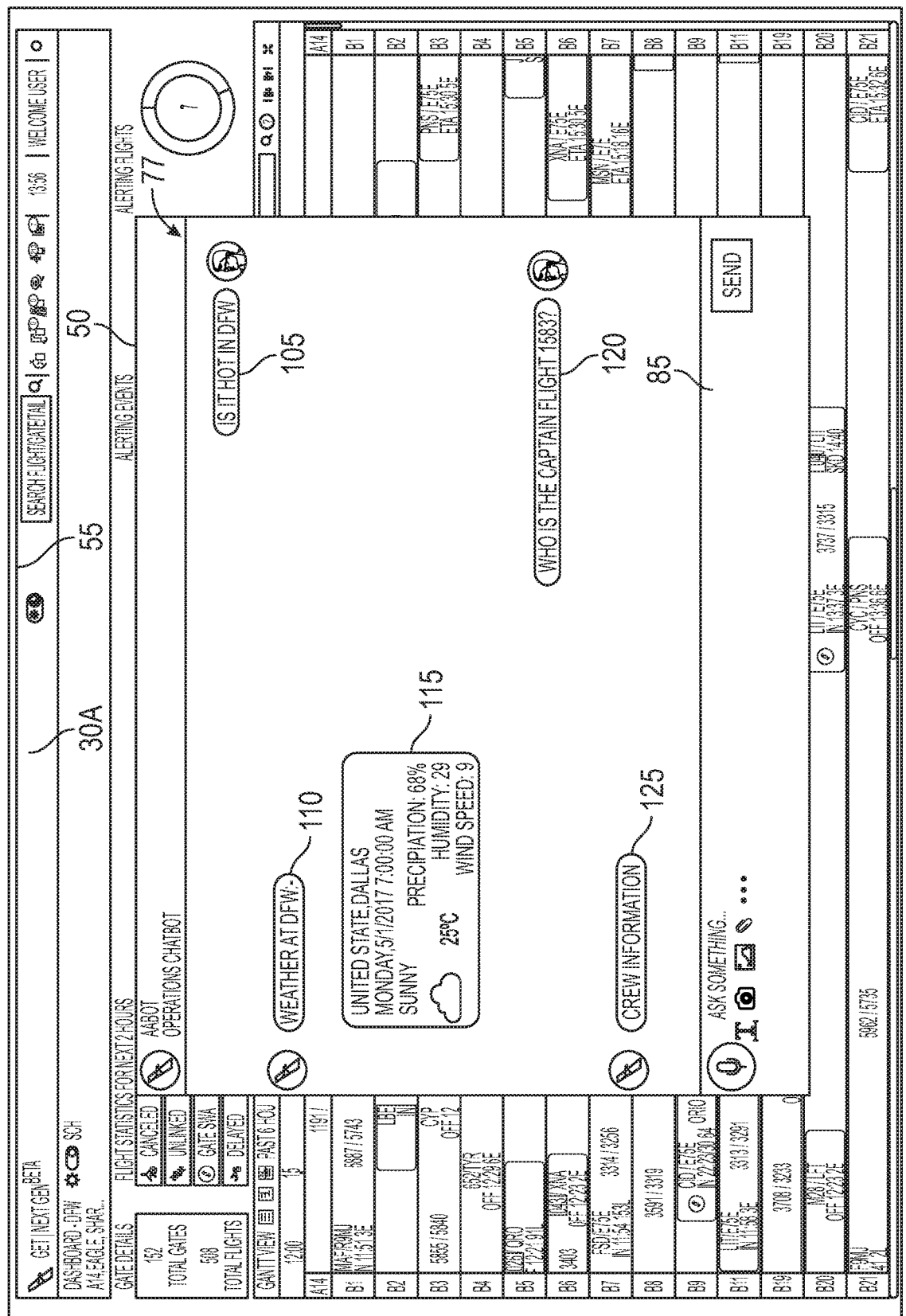
FIG. 5 is an illustration of the first and second window displayed by the graphical user interface of FIG. 1, according to another example embodiment.

The chat session 77 continues, as illustrated in FIG. 5. The user 45 submits an inquiry relating to the weather in Dallas, Tex. via the text entry "is it hot in dfw" to form the dialogue box 105. VARTA 15 searches the one or more applications 20 and responds with "Weather at DFW" to form the dialogue box 110 and the text/graphic combination that shows a cloud and the temperature details in text for Dallas, Tex. to form the dialogue box 115.

Figure 6:
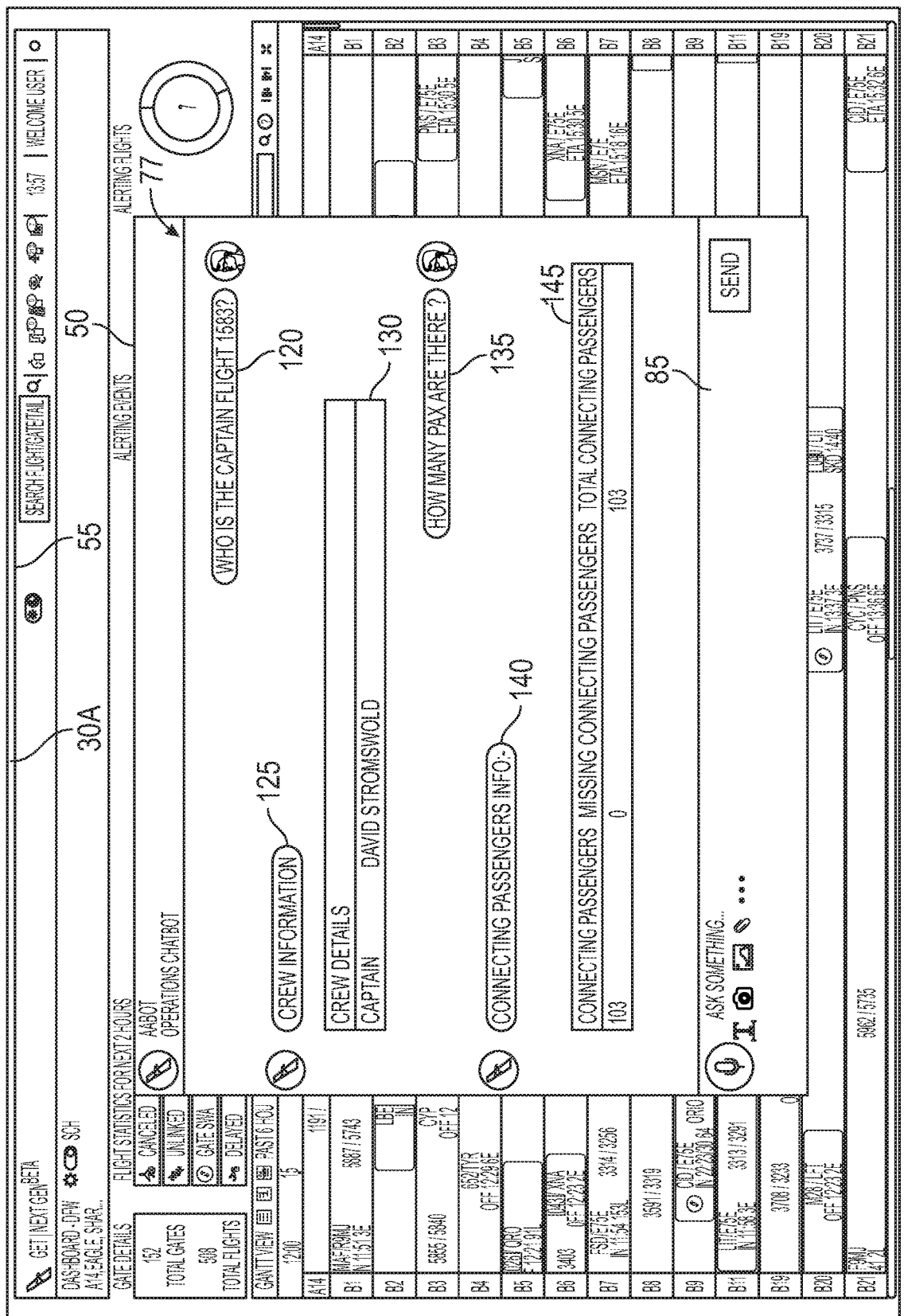
FIG. 6 is an illustration of the first and second window displayed by the graphical user interface of FIG. 1, according to another example embodiment.

The chat session 77 continues, as illustrated in FIG. 6. The user 45 requests "who is the captain flight 1583" to form the dialogue box 120. VARTA 15 responds with "crew information" to form dialogue box 125 and a portion of a chart to form dialogue box 130. The chat session continues by the user 45 requesting "how many pax are there" to form dialogue box 135. VARTA 15, using the previous inputs to guide the query regarding the specific flight, responds with "connecting passengers info:" to form dialogue box 140 and a portion of a chart that forms dialogue box 145. As illustrated, VARTA 15 uses the previous user inputs to provide context for the most recent user input or query. That is, when the user 45 provides initial inputs, VARTA 15 provides responses to successive questions based on the initial inputs.

In this example, the user 45 is viewing/working in one application (i.e., second application 20*b*) but receives: information via the dialogue boxes 95 and 100 from another application (i.e., the first application 20*a*); information via the dialogue boxes 110 and 115 from yet another application; information via the dialogue boxes 125 and 130 from yet another application; and information via the dialogue boxes 140 and 145 from yet another application. Conventionally, the user 45 would need to open four additional applications to search for and view the information received in the chat session 77. Here, the user 45 is capable of continuing to view at least a portion of the window 55 while receiving information from the other four data sources. Instead of opening each application, logging into each application, performing a search in each application, or navigating to the location in which the information is provided, and closing out of each application, VARTA 15 uses contextual inputs and user inputs to find, format, and display the relevant information to the user 45 in the chat session 77.

Figure 7:
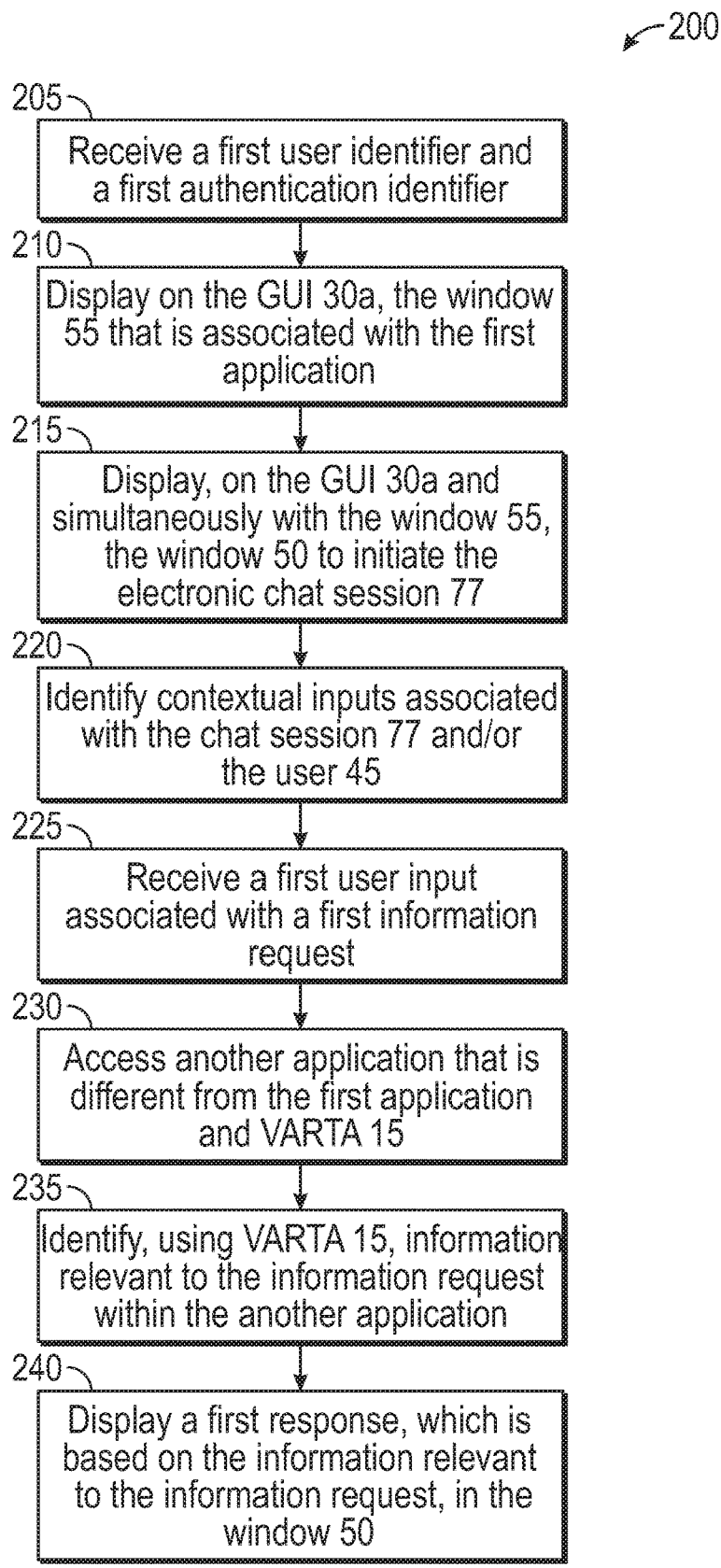
FIG. 7 is a flow chart illustration of a method of operating the system of FIG. 1, according to an example embodiment.

FIG. 7 illustrates a method 200 of using VARTA 15 to answer a query from the user 45 via the electronic chat session 77. The method 200 includes receiving a first user identifier and a first authentication identifier at step 205; displaying, on the GUI 30*a*, the window 55 that is associated with a first application at step 210; displaying, on the GUI 30*a* and simultaneously with the window 55, the window 50 to initiate the electronic chat session 77 at step 215; identifying contextual inputs associated with the chat session 77 and/or the user 45 at step 220; receiving via the window 50, a first user input associated with a first information request at step 225; accessing another application that is different from the first application and from VARTA 15 at step 230; identifying, using VARTA 15 and based on the user input and the contextual inputs, information relevant to the information request within the another application at step 235; and displaying the first response, which is based on the information relevant to the first information request, in the window 50 at step 240.

At the step 205, a user identifier and an authentication identifier are received by the system 10. In some embodiments, one or more of the applications 20 are configured to require receipt of a first user identifier and a first authentication identifier to allow the user 45 to gain direct access to information within the application. That is, the user 45 is generally required to login to each, or at least more than one, of the applications 20*a*-20*h*. After the system 10 receives the first authentication identifier and the first user identifier, the user 45 is provided direct access to the application. That is, the user 45 is permitted to view information within the application via windows associated with the application. In some embodiments, the first user identifier is a username, and the first authentication identifier is a password. Generally, each user has a defined role, employee status, or permission level depending on the role of the user/employee. In some embodiments, the user identifier of the user 45 is tied to the user's role, employee status, etc. Thus, upon the first application receiving the user identifier, VARTA 15 can associate a role, employee status, etc. with the user 45.

At the step 210, the window 55, which is associated with the first application, is displayed on the GUI 30a. Referring back to FIGS. 4-6, the window 55 is associated with the second application 20b and displays information relating to gate availability. In some embodiments, the window 55 is displayed on the GUI 30a after the user 45 provides his or her user identifier and authentication identifier. That is, after the user 45 logs into the second application 20b, the user 45 has direct access to the information within the second application 20b via the window 55.

At the step 215, VARTA 15 displays, on the GUI 30a, the window 50 to initiate the electronic chat session 77. In some embodiments, the window 50 is displayed in response to the user 45 indicating that he or she needs help. In some cases, the user 45 selects a "help" or "search" button available within the application that the user 45 is viewing. In some embodiments, the window 55 is displayed simultaneously with the window 50. Generally, the dialogue box 80 is displayed in the window 50 during the step 215.

At the step 220, VARTA 15 identifies contextual inputs associated with the chat session 77 and/or the user 45. In an example embodiment, contextual inputs include an identifier of the application from which VARTA 15 was executed, such as the second application 20b in this example. In some embodiments, contextual inputs also include information regarding the user 45, such as the role or the user permission level of the user 45, the location of the user 45, etc. In some embodiments, contextual inputs include information displayed on the page 55. In some embodiments, contextual inputs include any previous user inputs provided by the user in the chat session 77 or a previous chat session. In some embodiments, and when the user selects or highlights (via clicking on or hovering over a portion using a pointer or cursor) a portion of the information displayed on the window 55, then a processor receives an indication that the portion of the information is highlighted or selected. In some embodiments, this highlighted or selected portion of information is a contextual input. In some embodiments, contextual inputs include data regarding previous activity of the user 45 within the first application.

At the step 225, the user input is received via the input box 85 of the window 50. Generally, the first user input is associated with a first user request. Generally, the inputs or query from the user 45 (received via the dialogue boxes 90, 105, 120, and 135 that form a portion of the chat session 77) are in natural language format. That is, the user provides conversational phrases or provides inputs like a person would in a normal conversation.

At the step 230, VARTA 15 accesses another application that is different from the first application and that is different from VARTA 15. Generally, VARTA 15 accesses the another application regardless of whether the user has provided his or her user identifier and user authentication identifier associated with that application.

At the step 235, VARTA 15 identifies information relevant to the information request within the another application at step 235.

At the step 240, VARTA 15 displays the first response, which is based on the information relevant to the information request, in the window 50. As noted above, in some embodiments, VARTA 15 reformats the information relevant to the information request to form the response that is displayed in the window 50. In some embodiments, the information relevant to the information request is also displayed in the window 50. In some embodiments, a citation to the information relevant to the information request is also displayed in the window 50.

Figure 8:
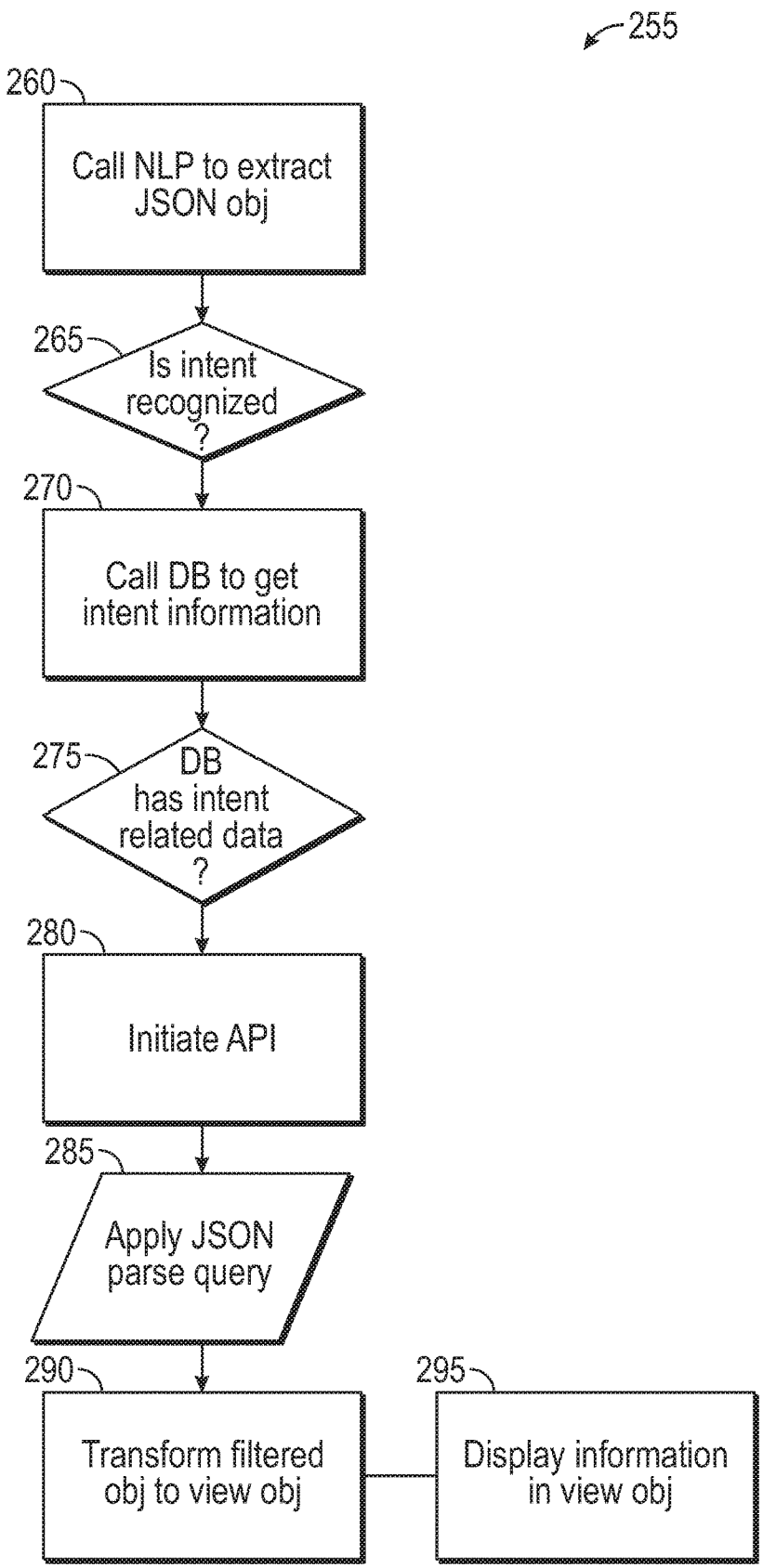
FIG. 8 is a flow chart illustration of a method of operating the system of FIG. 1, according to another example embodiment.

FIG. 8 illustrates a detailed method 255 of answering a query from the user 45 via the electronic chat session 77 using VARTA 15. Specifically, the method 255 provides additional details regarding the completion of the steps 225, 230, 235, and 240 of the method 200. The method 250 includes VARTA 15 calling the NLP 25 to extract JSON objects at step 260; determining whether the intent of the user input is recognized at step 265; calling the one or applications 20 to get intent information at step 270; determining whether one or more of the applications 20 has intent related data at step 275; initiating API at step 280; applying JSON parse query at step 285; transforming a filtered object to view object at step 290 to create the first response; and displaying the information in the window 50 in view object at step 295.

Figure 9:
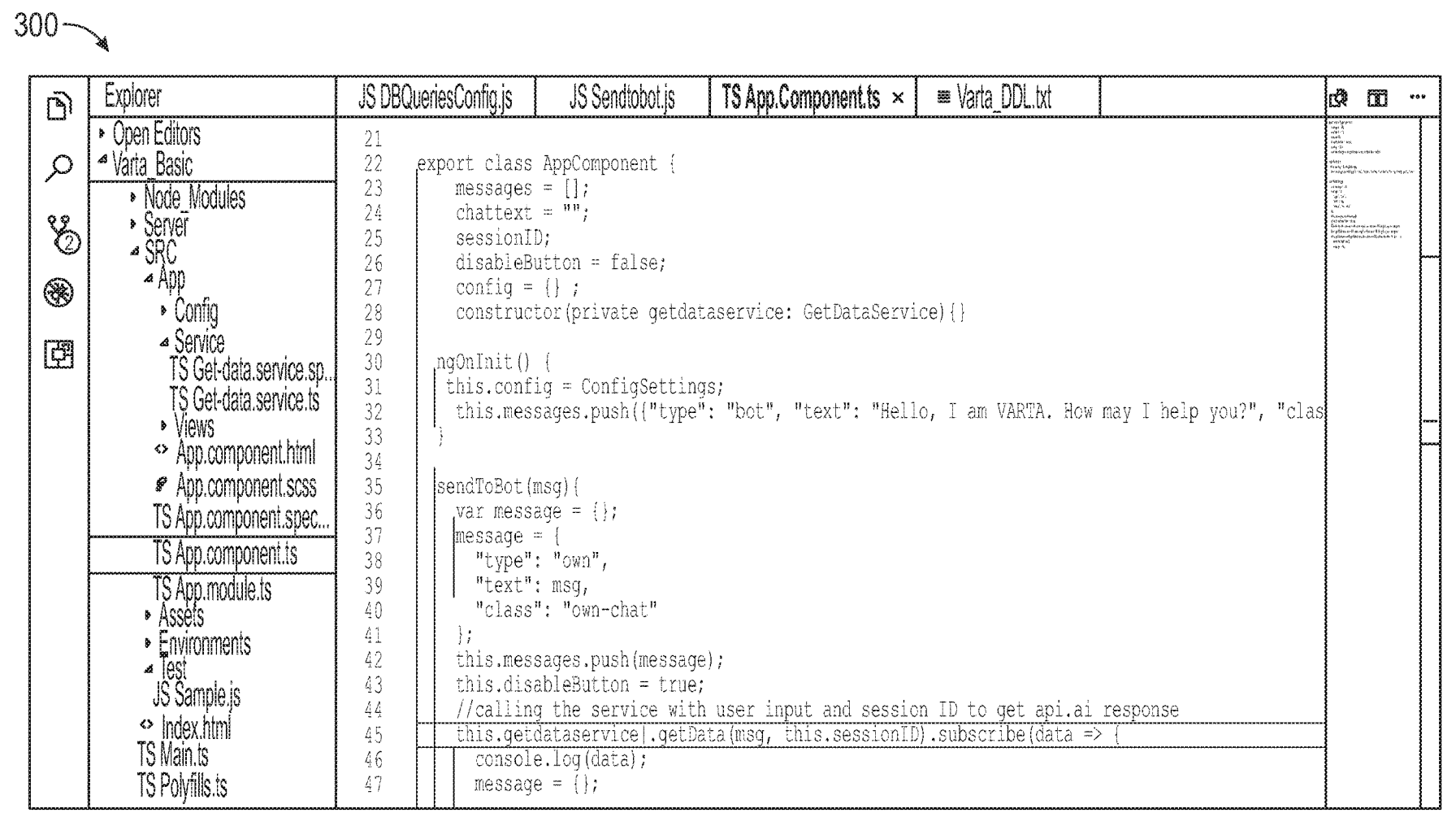
Figure 10:
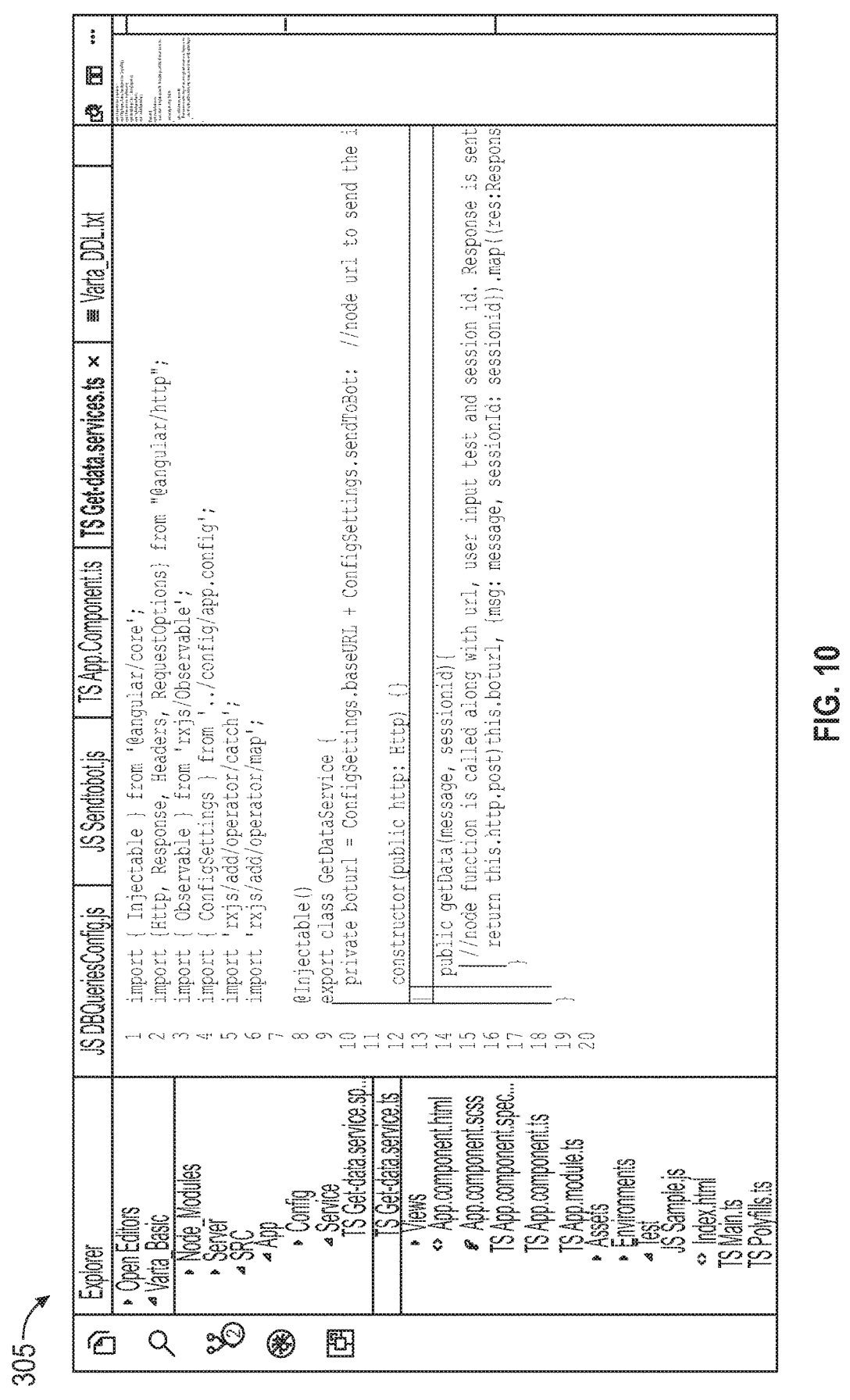
Figure 11:
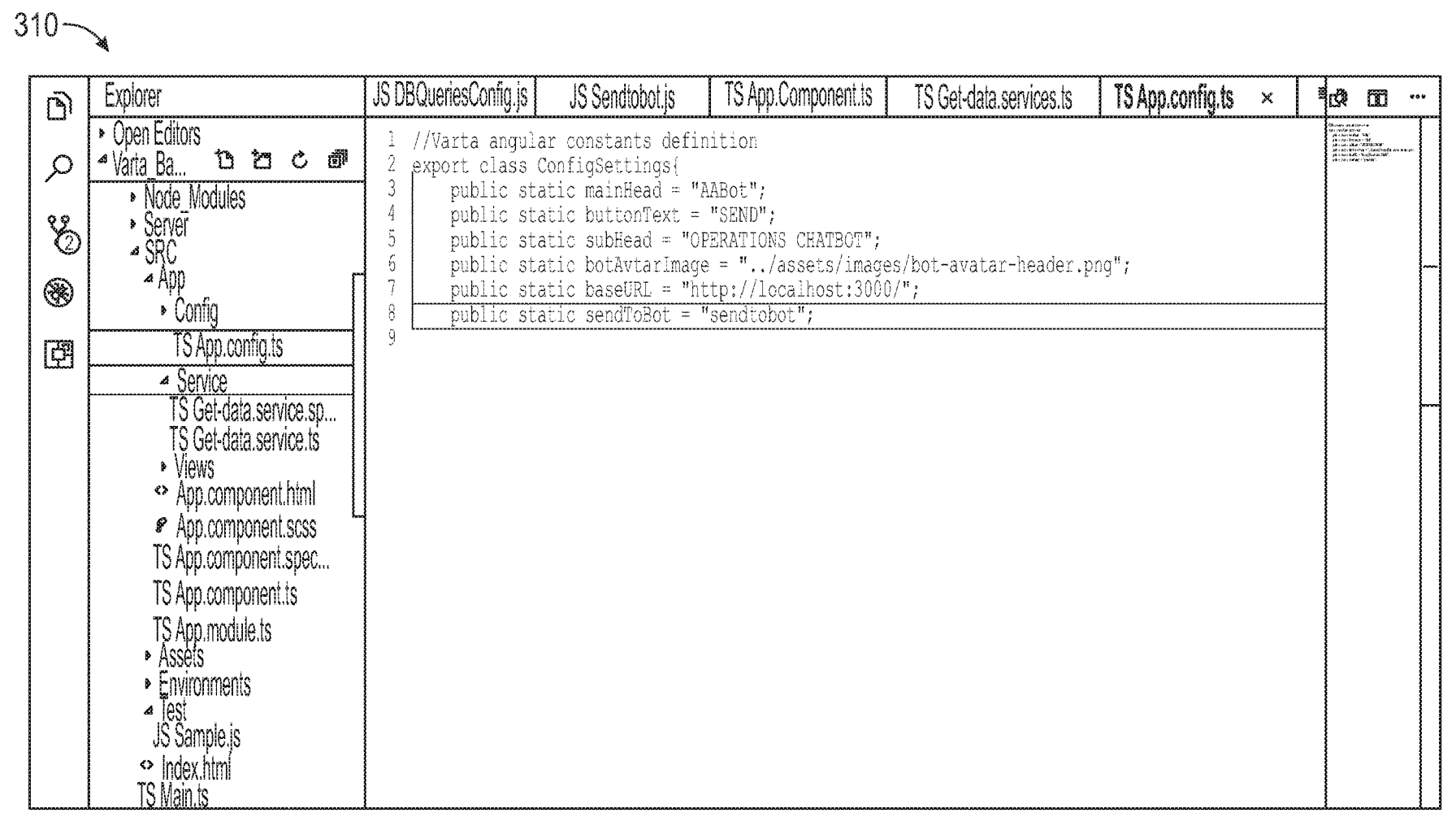

At the step 260, VARTA 15 calls the NLP 25 to extract JSON objects from the user input. In some embodiments, an angular component is associated with the window 50 and is used for getting and processing the user queries and displaying the response back to the user 45. In this example, the angular component captures the query or user input and it is passed to an angular data service to make a node JS function call or other back ends such as JAVA, net, Python, etc. FIG. 9 is screenshot 300 displaying a plurality of instructions regarding the angular component, according to an example embodiment. The angular data service then makes the node JS call along with the user query. FIG. 10 is screenshot 305 displaying a plurality of instructions regarding the node JS call, according to an example embodiment. Generally, the node URLs are stored in app.config. file. FIG. 11 is screenshot 310 displaying a plurality of instructions regarding the angular component, according to an example embodiment. The node JS is responsible for processing the user queries received from the angular front end and sending back the response. The inputs from the user 45 are captured in sendtobot.js. FIG. 12 is screenshot 315 displaying a plurality of instructions regarding the user inputs and sendtobot.js, according to an example embodiment.

Figure 13:
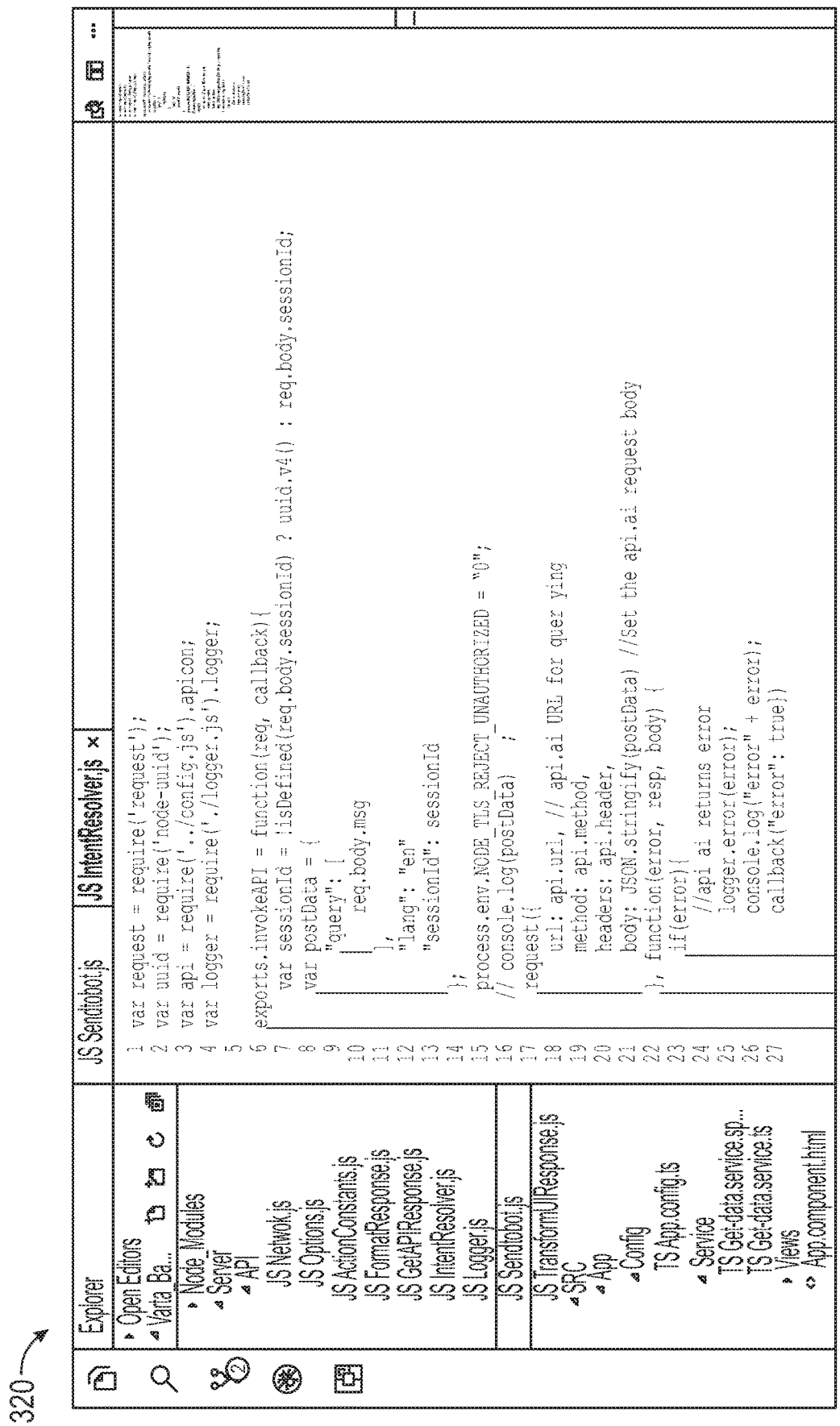
FIG. 13 is another screenshot displaying another plurality of instructions, according to an example embodiment.

During the step 260, the user inputs are passed to an intentResolver.js to make a call to api.ai. FIG. 13 is a screenshot 320 displaying a plurality of instructions regarding the user inputs being passed to the intentResolver.js, according to an example embodiment. The api.ai headers are stored in config.js file, as illustrated in a screenshot 325 of FIG. 14 that displays a plurality of instructions. The IntentResolver.js makes the call to api.ai along with the user query and session id. The API response is sent back to sendtobot.js. The Sendtobot.js identifies the type of the api.ai response.

Figure 15:
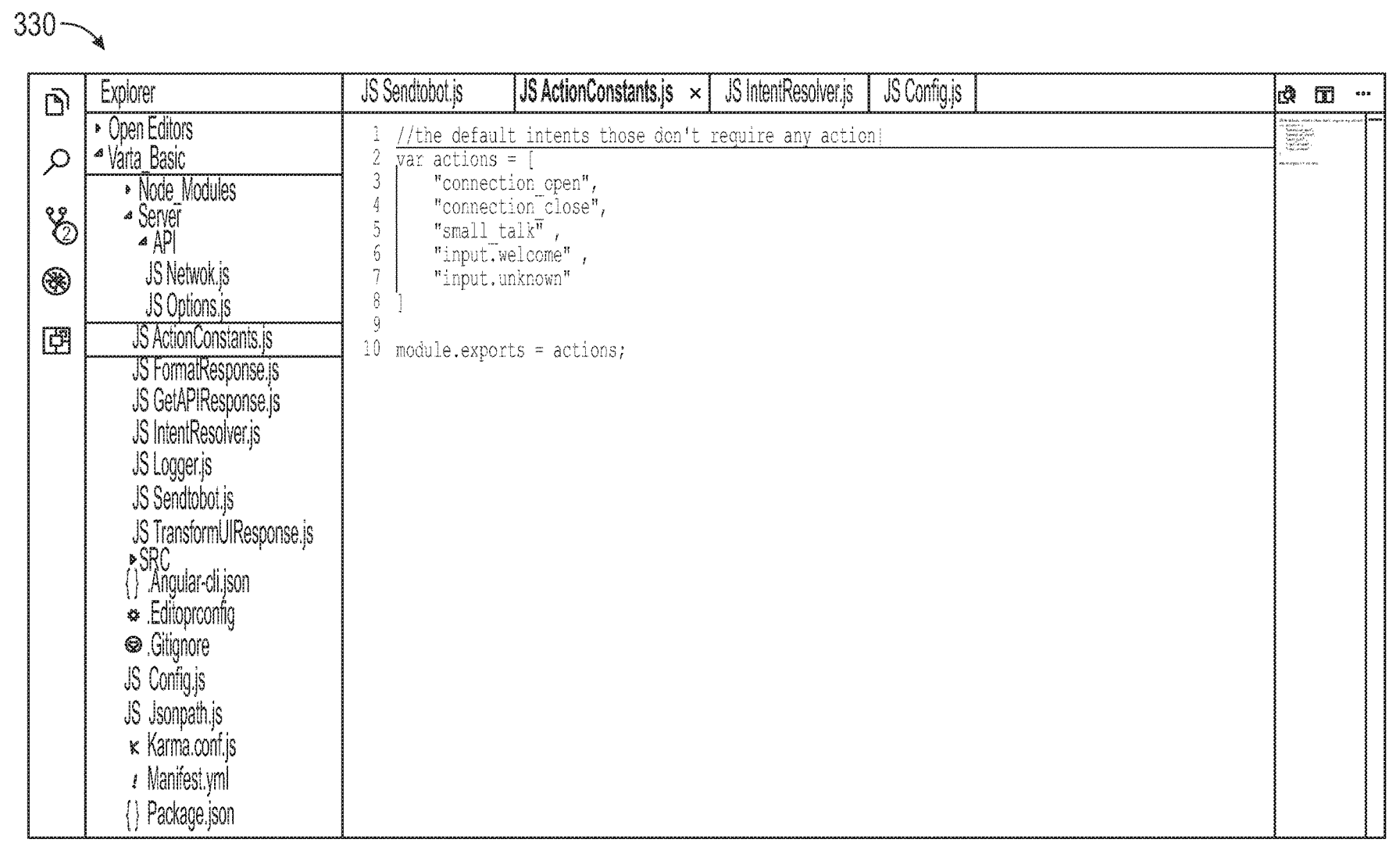

At the step 265, VARTA 15 determines if the intent is recognized. In this example, the response action name is attempted to be matched with the predefined set of functions in actionconstants.js, as illustrated in a screenshot 330 of FIG. 15 that displays a plurality of instructions. If the API response has an action name which requires a service call, then the response is passed to getAPIResponse.js.

Figure 16:
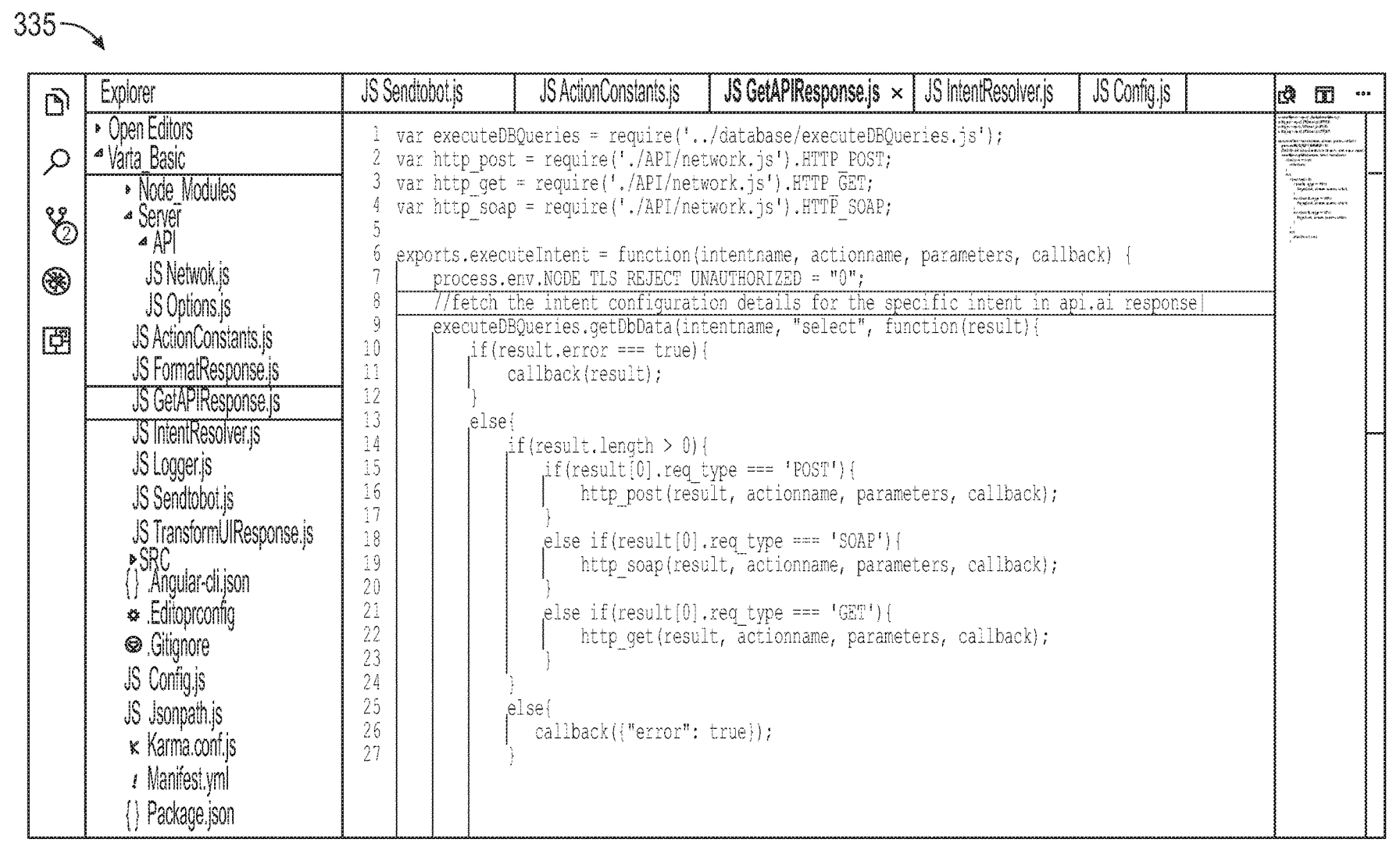

At the step 270, VARTA 15 makes a database call to get intent information. That is, VARTA 15 calls the one or applications 20 to get intent information. In this example, the GetAPIResponse.js makes a database call to fetch the configuration for the api response intent, as illustrated in a screenshot 335 of FIG. 16 that displays a plurality of instructions.

Figure 17:
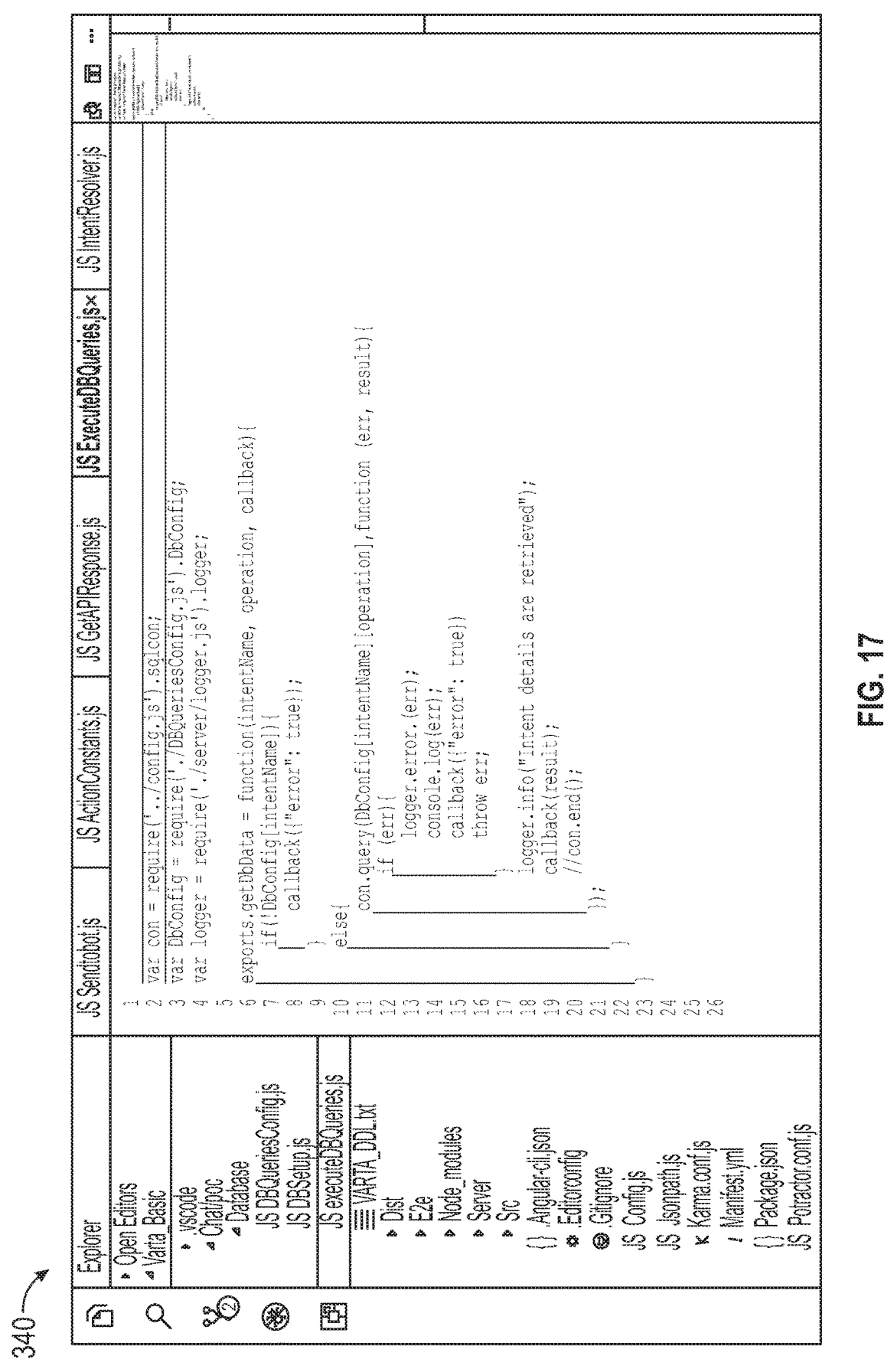
Figure 18:
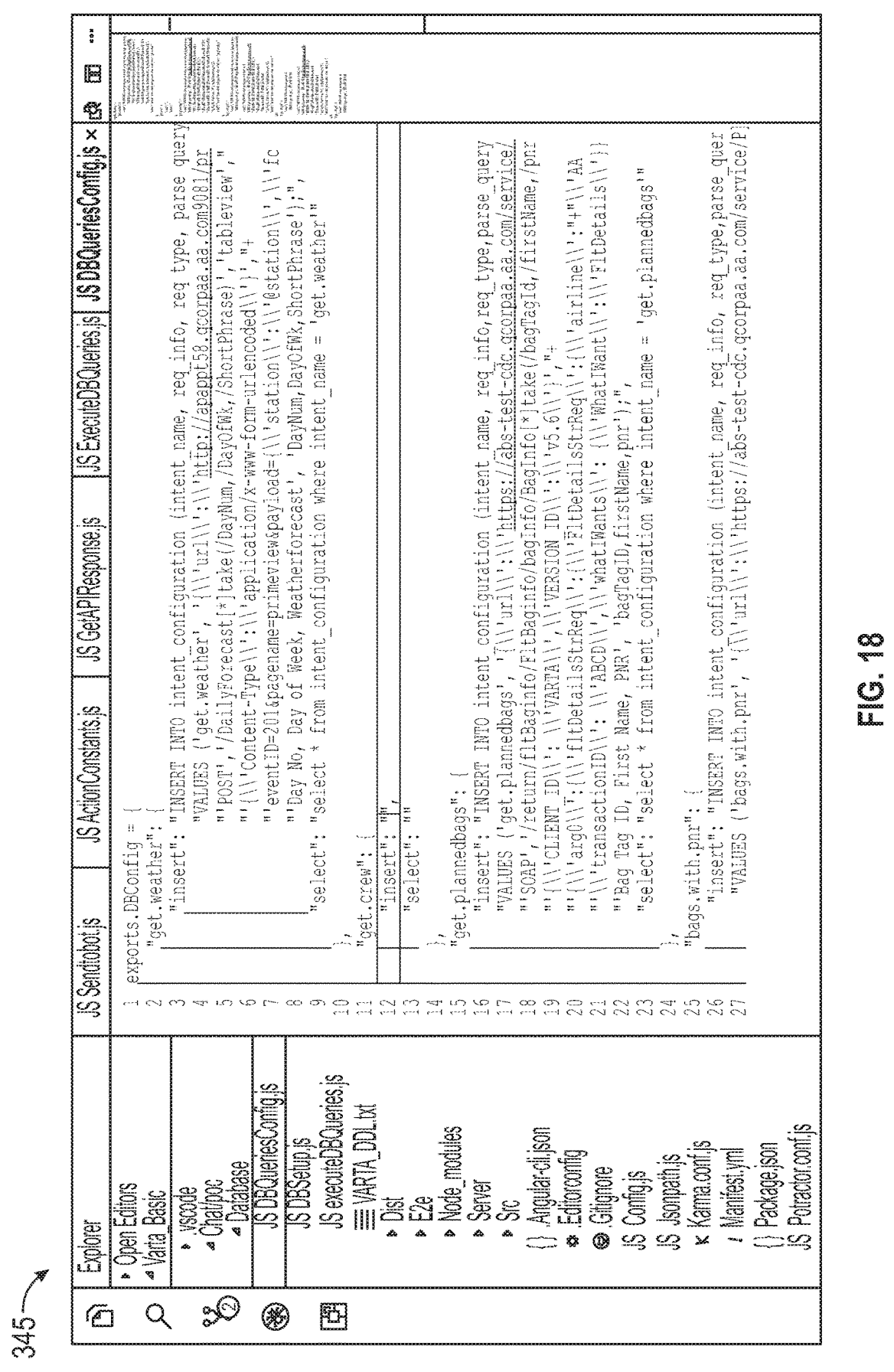

At the step 275, VARTA 15 determines if the DB has intent related data. That is, VARTA 15 determines which application in the one or more applications 20 has intent information that matches the identified intent from the user input. In this example and during the step 230, the database call is made in executeDBQueries.js, as illustrated in a screenshot 340 of FIG. 17 that displays a plurality of instructions. The Execute DBQueries.js fetches the mysql connection details from config.js and the intent query details from DBQueriesConfig.js, as illustrated in a screenshot 345 of FIG. 18 that displays a plurality of instructions. The details for the API response intent is retrieved from the database and is sent back to getAPIResponse.js. The response includes the type of service, URL to be called, header, payload, parse query which is used to filter the result, the headings to display, and the attributes to be selected from the response.

Figure 19:
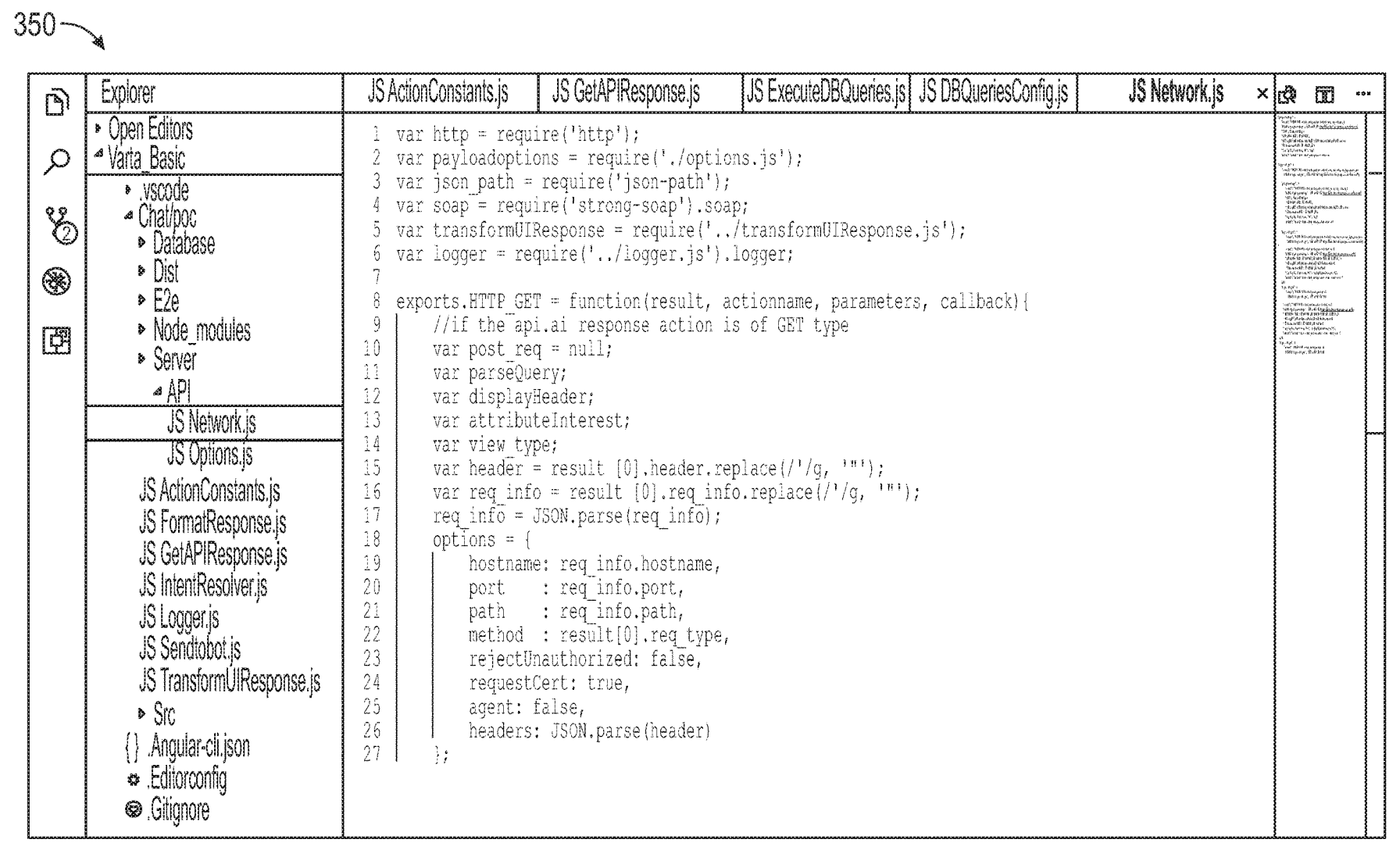

At the step 280, API is initiated. If executeDBQueries returns a value, then getAPIResponse.js identifies the type of the service which is to be called. In some embodiments, the service can be POST, GET, SOAP, etc. Based on the type of service, corresponding methods are invoked from Network.js, as illustrated in a screenshot 350 if FIG. 19 that displays a plurality of instructions.

At step 285, JSON parse query is applied. In this example, the response is filtered using json-path node module and the result is sent to transformUIResponse.js.

Figure 20:
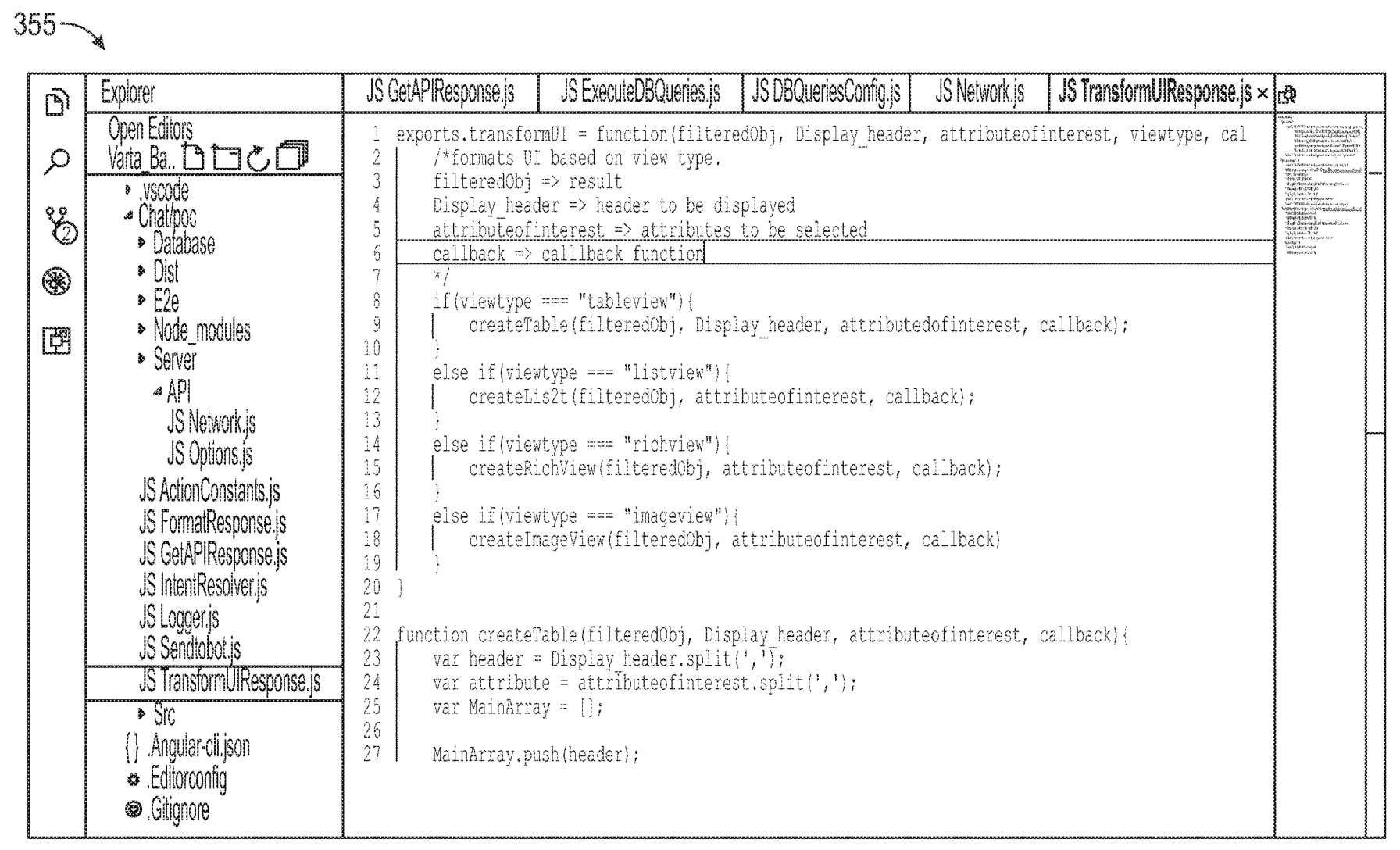

At the step 290, the filtered object view is transformed to a view object. In this example, and as illustrated in the plurality of instructions displayed on the screenshot 355 of FIG. 20, TransformUIResponse.js formats the filtered result based on the view type of the corresponding intent. The views can be image view, table view, list view, multimedia view, rich text, etc. The result or response is converted to any of these formats and the formatted response is sent back to sendtobot.js.

Figure 21:
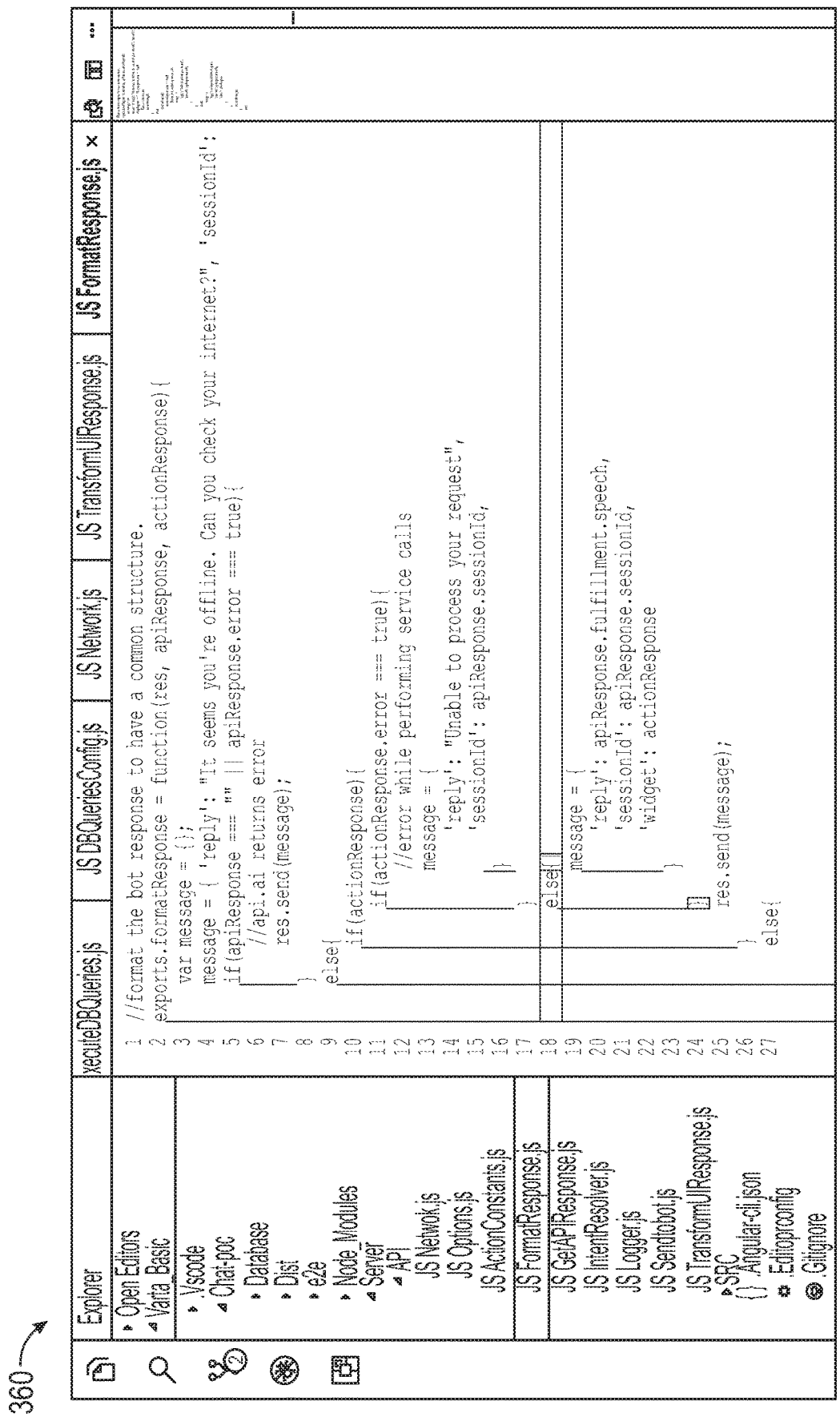
FIG. 21 is another screenshot displaying another plurality of instructions, according to an example embodiment.
Figure 22:
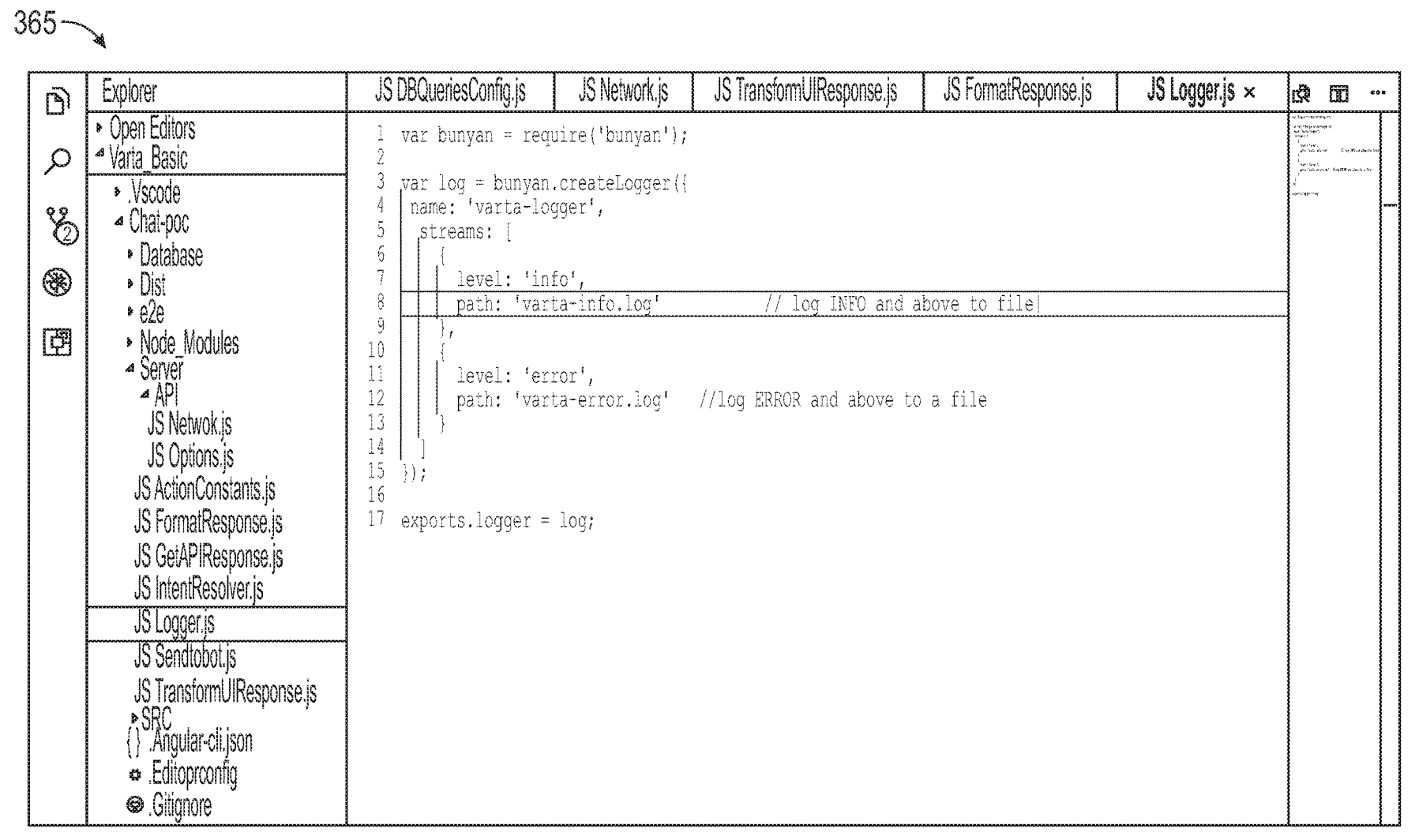
Figure 23:
FIG. 23 is another screenshot displaying another plurality of instructions, according to an example embodiment.
Figure 24:
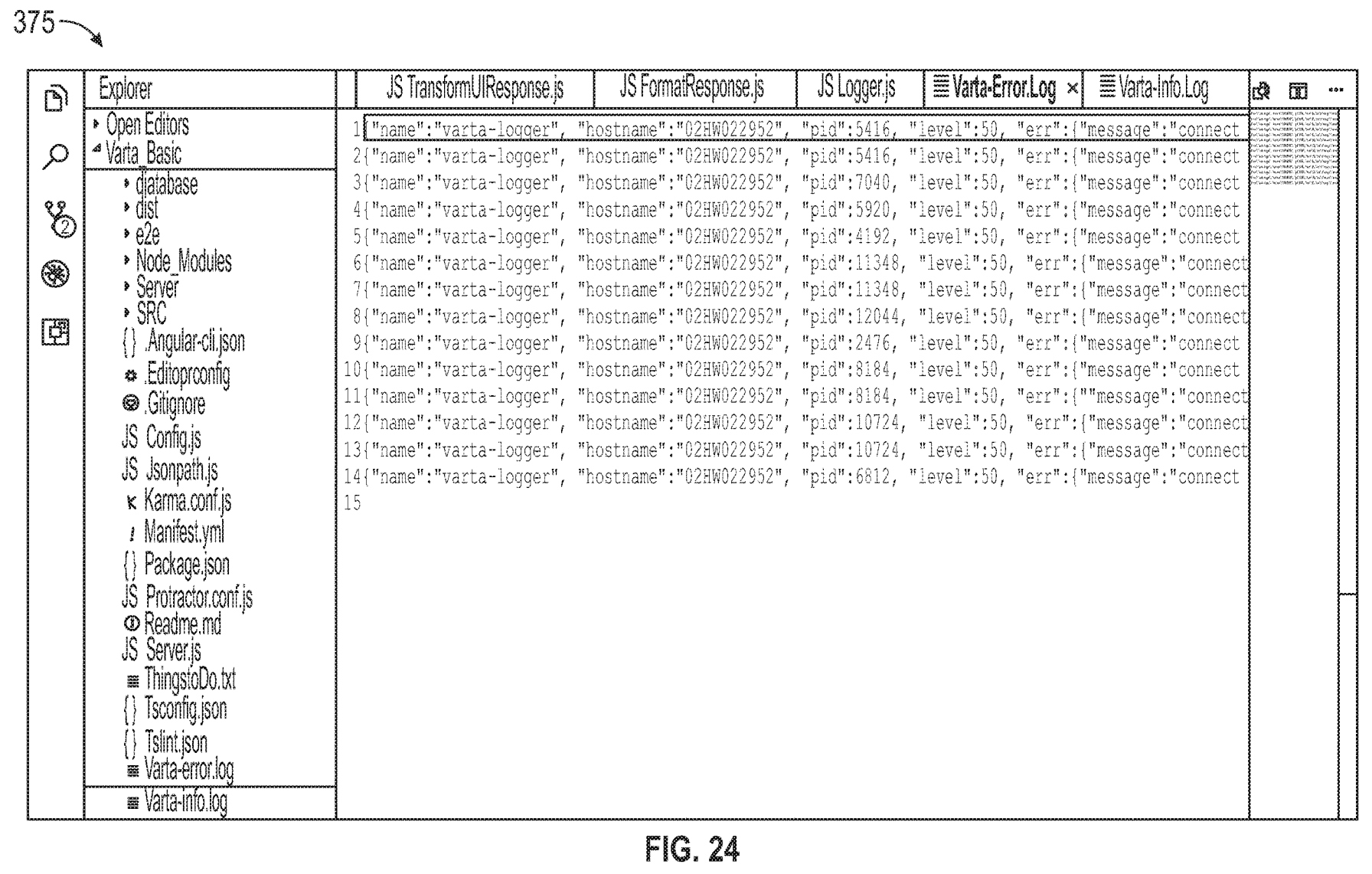
Figure 25:
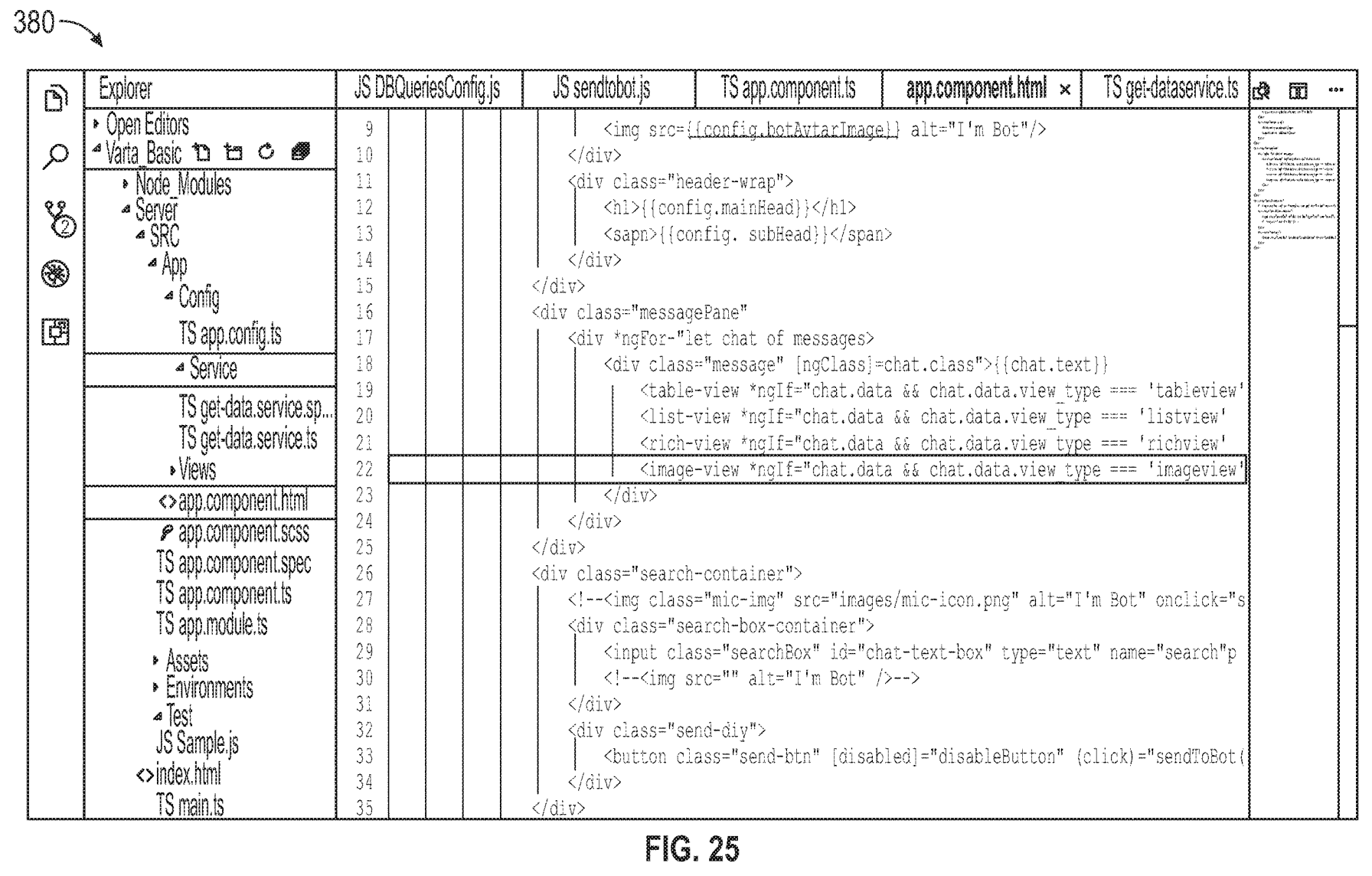
Figure 26:
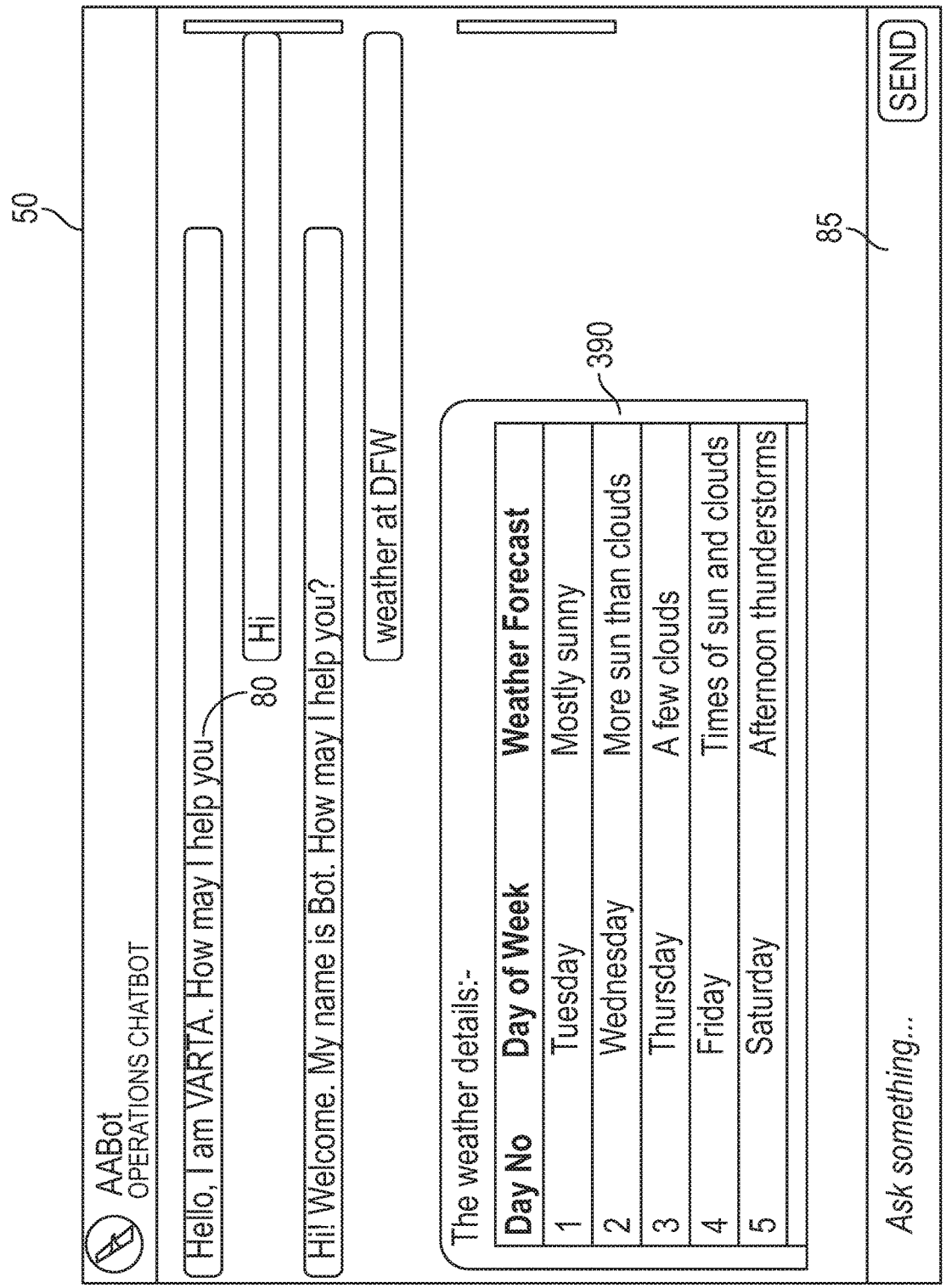
FIG. 26 illustrates the second window of FIG. 4, according to another example embodiment.

At the step 295, the information is displayed to the user 45 via the window 50. Generally, the step 250 includes the Sentobot passing the formatted response to formatResponse.js, as illustrated in the plurality of instructions displayed on a screenshot 360 of FIG. 21, to convert it to a common format, which is in turn sent to the GUI 30a, via the angular component. The process involving Node JS is logged using node-bunyan into the files varta-info.log and varta-error.log, which is captured in logger.js, as illustrated in the plurality of instructions displayed on a screenshot 365 of FIG. 22; in the plurality of instructions displayed on a screenshot 370 of FIG. 23; and in the plurality of instructions displayed on a screenshot 375 of FIG. 24. In some embodiments, the FormatResponse.js sends the result back to the angular component and the angular component receives the result. The angular app component decides how to present the result to the user, as illustrated in the plurality of instructions displayed on a screenshot 380 of FIG. 25. Example presentations include: displaying the response as plain text; displaying the result as a table, with the table view component being rendered; displaying the result as list of items, with the list view being rendered; displaying as rich text format, with the rich view component being rendered; and displaying the result or a part of the result as image, with the image view being rendered. As illustrated in FIG. 26, the result is displayed to the user 45 to form the dialogue box 390. In some embodiments, the result is communicated via audio to the user 45 using a speaker of the computer 30, tactile alert, etc.

If, at the step 265, VARTA 15 does not recognize the intent associated with the original user input, then VARTA 15 displays, on the window 50, a message requesting the user 45 to ask or restate the query in a different way. The user 45 can then provide a revised input, and VARTA 15 then proceeds to the step 225. After displaying the response at the step 240 or 295, VARTA 15 displays a dialogue box that asks the user 45 if he or she is satisfied with the response, with a dialogue box including a yes selectable box and a no selectable box. When the user 45 selects the yes selectable box, VARTA 15 associates the original user input with the revised input and/or the intent, to train the NLP 25 and expand the user inputs associated with the intent. If, at the step 275, VARTA 15 determines none of the one or more applications 20 contains the information needed to answer the query of the user, VARTA 15 displays, on the window 50, a message that information to answer the query is not available. VARTA 15 displays a dialogue box, on the window 50, that asks the user 45 if he or she is satisfied with the response, with a dialogue box that includes a yes selectable box and a no selectable box.

Figure 27:
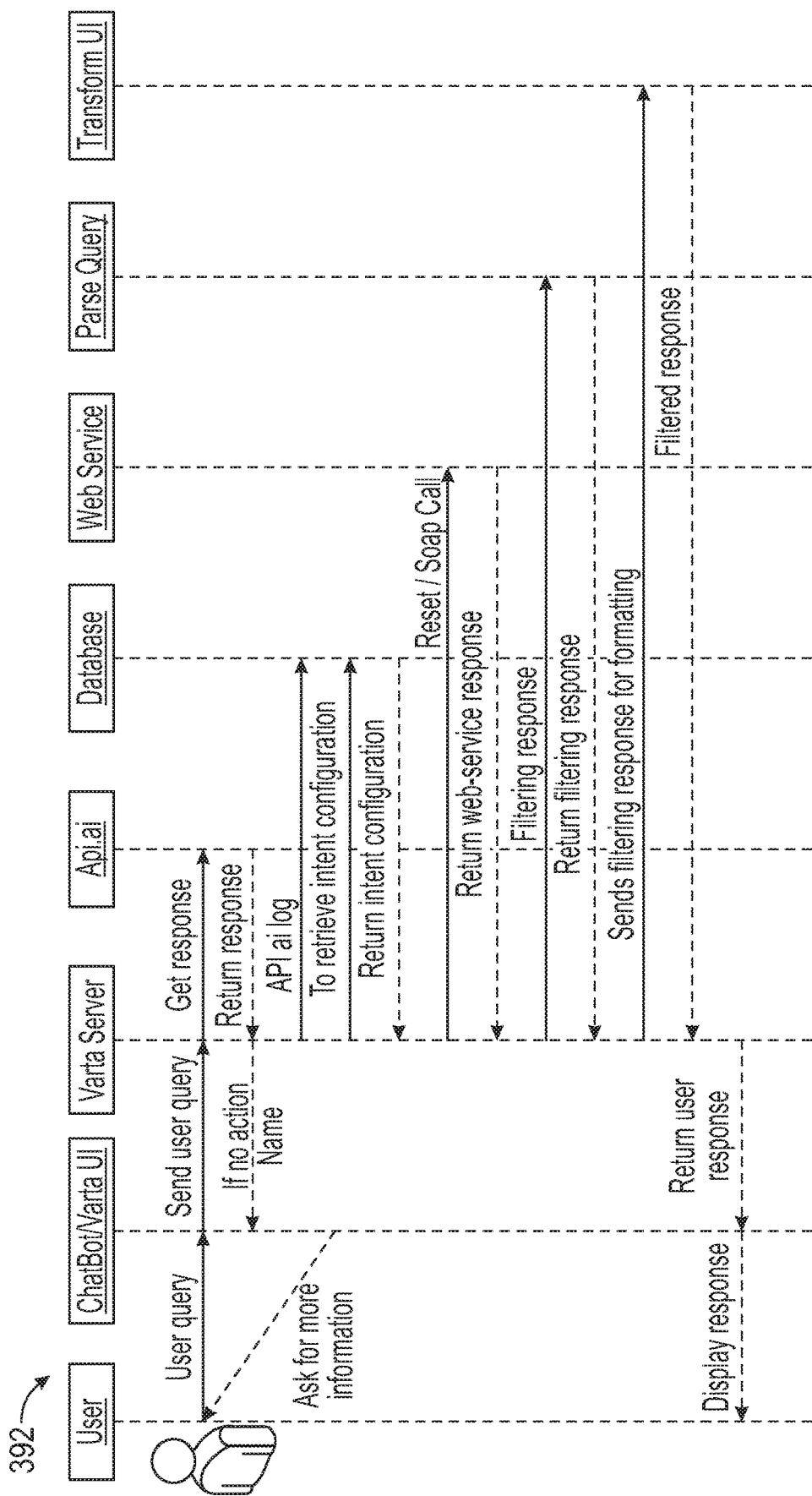
FIG. 27 illustrates a sequence diagram related to the method of FIG. 8, according to an example embodiment.
Figure 28:
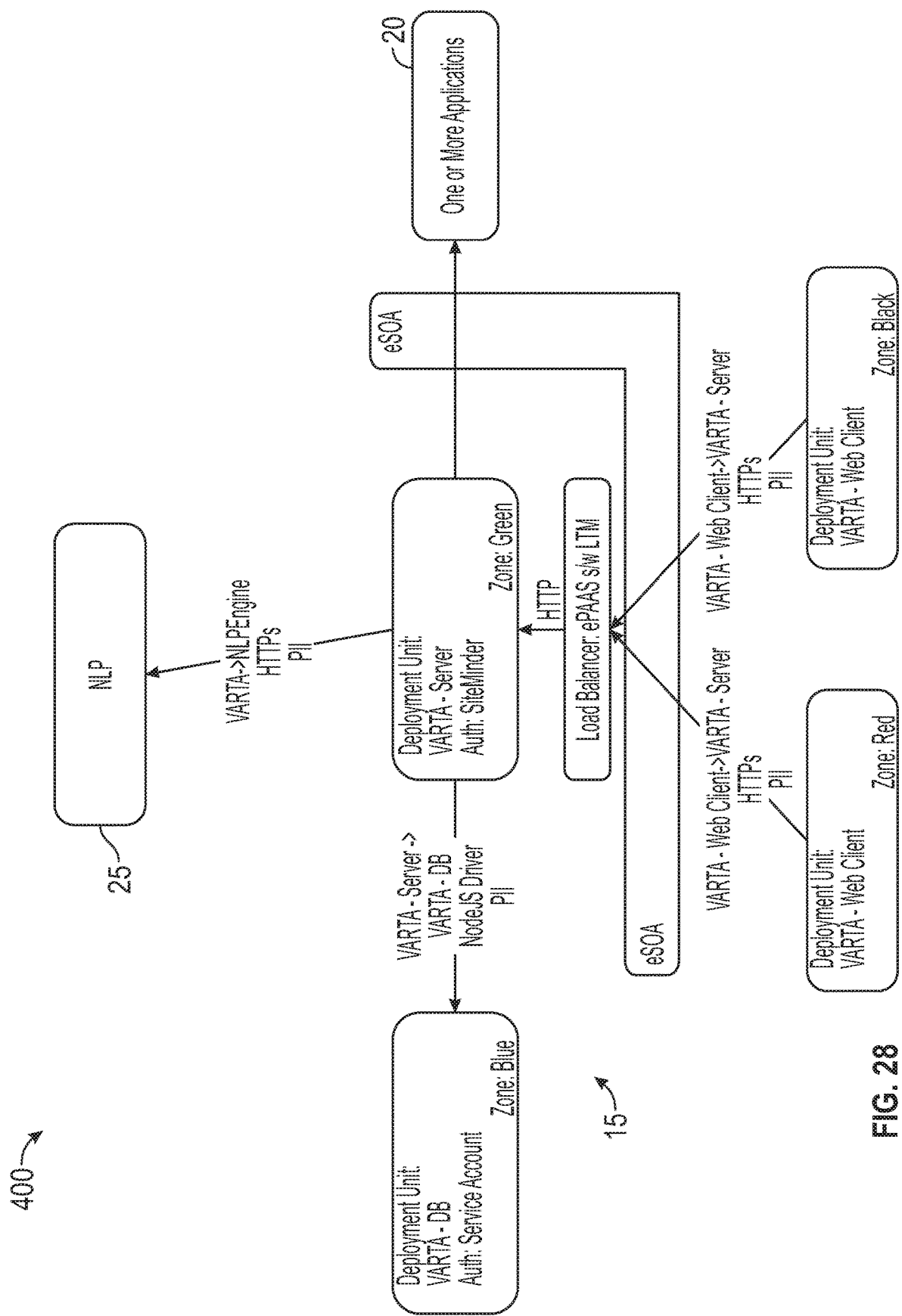
FIG. 28 is an illustration of application interactions and data exchange of the system of FIG. 1, according to an example embodiment.

FIG. 27 is a sequence diagram 392 associated with VARTA 15 during the chat session 77. FIG. 28 is diagram 400 illustrating application interactions and data exchange associated with VARTA 15 during the chat session 77.

FIG. 29 is a table 405 with examples of user input and corresponding expected responses and source of data associated with the seventh application 20g.

FIGS. 30A and 30B together form a table 410 with examples of user input and corresponding expected responses and source of data associated with the second application 20b.

FIG. 31 is a table 415 with examples of user input and corresponding expected responses and source of data associated with a DV8 application.

FIG. 32 is a table 420 with examples of user input and corresponding expected responses and source of data associated with the third application 20c.

FIG. 33 is a table 425 with examples of user input and corresponding expected responses and source of data associated with the Ramplink Next Generation application.

FIG. 34 is a table 430 with examples of user input and corresponding expected responses and source of data associated with the TLINK application.

Using the system 10 and/or completing at least a portion of the method 200 improves the functioning of the computer 30 and provides an improvement to the technical field of data management. Conventionally, users (e.g., employees, customers) are required to navigate through multiple screens in various systems to obtain information or at least identify a document in which desired information is stored. Even when the user 45 finds a document containing the desired information using conventional searching, the user 45 is required to navigate through the document to find the desired information. Thus, the user 45 is required to often read through multiple documents to find the correct answer. This opening and searching through documents increases the processing load of the computer 30.

Using VARTA 15, the experience of the user 45 is streamlined and the business process involving the user 45 is improved. The function of the computer 30 is also improved, as VARTA 15 performs the searching on a processor that is separate and remote from the processor 30b. The computer 30 merely displays the result or response, which reduces the processing load compared to the computer 30 needing to open multiple applications and load multiple files for the user 45 to review. Considering contextual inputs in the query also reduces the processing load of the computer 30. That is, instead of the user 45 needing to type in additional search parameters and inputs, VARTA 15 automatically considers these contextual inputs without requiring additional processing associated with the input and processing of the additional user inputs. Reducing the processing load of the computer 30 generally improves the performance of the computer 30 such that the available memory of the computer 30 is increased, the processing capacity of the computer 30 is increased, and the processing speed of the computer 30 is increased. Thus, VARTA 15 improves the functioning of the computer 30 itself. That is, the system 10 results in specific improvements in computer capabilities (i.e., reduction of required memory and reduction of processing load).

Moreover, for conventional methods within the technical field of data management, if it is determined that an application should display new data points, then the application must ingest data into its back-end system. Changes are then required in the front-end system of the application. Only then will the new data points be available to a user using the application.

Using VARTA, however, when a user needs to access new data points, VARTA 15 queries source system of the data to get the requested information and avoids the ingestion of data, and no changes are needed to the front-end system of the application, as is required in conventional methods.

VARTA 15 also improves the training process for employees that are unfamiliar with policies, procedures, etc. For example, VARTA 15 answers questions based on the company operational data, manuals, policies and procedures and provides a link to the relevant document for the user 45 to further review. VARTA 15 can be used to trouble shoot IT issues, etc. For example, the user 45 can input "how do I request a new e-mail account" or "What's the email account request process?" and VARTA 15 will present to the user 45 a form flow and request which type of account the user requires (e.g., employee, contractor, shared account). In this example, VARTA 15 processes data from a web page regarding how to request a new email and answers the question. Not only does VARTA 15 pull information from the one or more applications 20, VARTA 15 can take actions such as book a flight, reroute a bag, etc. using one of the one or more applications 20, etc.

VARTA 15 allows for the user 45 to access other information relevant to his or her job without moving out of their current application or having to engage other user groups to help with the information. In some embodiments, VARTA 15 gives the user 45 easier access to information for quicker decision making and ease in performing his or her duties. This can result in quicker and more accurate customer service. When using audio inputs and audio outputs, VARTA 15 results in more hands-free use of the applications.

In some embodiments, VARTA 15 is integrated with Skype, Slack, or a variety of other web applications. In some embodiments, VARTA 15 is integrated with flat file formats.

In some embodiments, VARTA 15 is stored in a computer that is similar but a different computer from the computer 30.

In some embodiments, VARTA 15 displaying the window 50 on the GUI 30a transforms the GUI 30a to a specific, structured GUI 30a that is paired with a prescribed functionality (ability to search through multiple applications without opening the applications) that is directly related to a specifically identified problem in the prior art (searching through multiple applications and documents to find the information needed).

In one or more example embodiments, each of the applications is stored in the computer readable medium. In some embodiments, the application includes and/or executes one or more web-based programs, Intranet-based programs, and/or any combination thereof. In an example embodiment, the application includes a computer program including a plurality of instructions, data, and/or any combination thereof. In an example embodiment, the application is written in, for example, HyperText Markup Language (HTML), Cascading Style Sheets (CSS), JavaScript, Extensible Markup Language (XML), asynchronous JavaScript and XML (Ajax), iOS, xCode, Swift, Android for mobile, and/or any combination thereof. In an example embodiment, the application is a web-based application written in, for example, Java or Adobe Flex, which pulls real-time information from another computer and/or a plurality of data sources. In an example embodiment, the application pulls real-time information from the plurality of data sources, upon the execution, opening or start-up of the application. In an example embodiment, the application is stored on the computer readable medium and/or in the database.

In an example embodiment, the network 40 includes the Internet, one or more local area networks, one or more wide area networks, one or more cellular networks, one or more wireless networks, one or more voice networks, one or more data networks, one or more communication systems, and/or any combination thereof.

Figure 35:
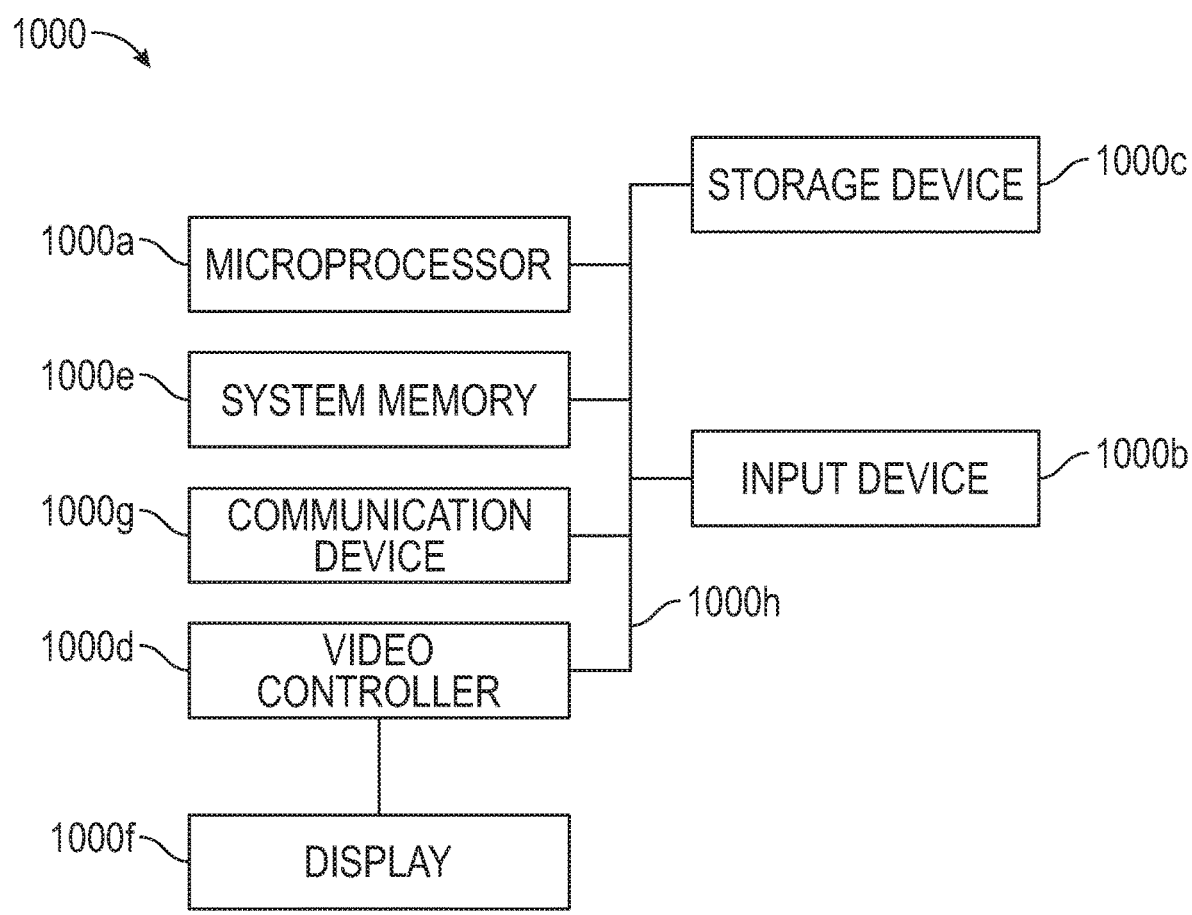
FIG. 35 is a diagrammatic illustration of a node for implementing one or more example embodiments of the present disclosure, according to an example embodiment.

In an example embodiment, as illustrated in FIG. 35 with continuing reference to FIGS. 1-29, 30A, 30B, and 31-34, an illustrative node 1000 for implementing one or more of the example embodiments described above and/or illustrated in FIGS. 1-29, 30A, 30B, and 31-34 is depicted. The node 1000 includes a microprocessor 1000a, an input device 1000b, a storage device 1000c, a video controller 1000d, a system memory 1000e, a display 1000f, and a communication device 1000g, all interconnected by one or more buses 1000h. In several example embodiments, the storage device 1000c may include a thumb drive, hard drive, CD-ROM, optical drive, any other form of storage device and/or any combination thereof. In several example embodiments, the storage device 1000c may include, and/or be capable of receiving, a floppy disk, CD-ROM, DVD-ROM, or any other form of computer-readable medium that may contain executable instructions. In several example embodiments, the communication device 1000g may include a modem, network card, or any other device to enable the node to communicate with other nodes. In several example embodiments, any node represents a plurality of interconnected (whether by intranet or Internet) computer systems, including without limitation, personal computers, mainframes, PDAs, smartphones and cell phones.

In several example embodiments, one or more of the components of the systems described above and/or illustrated in FIGS. 1-29, 30A, 30B, and 31-34 include at least the node 1000 and/or components thereof, and/or one or more nodes that are substantially similar to the node 1000 and/or components thereof. In several example embodiments, one or more of the above-described components of the node 1000, the system 10, and/or the example embodiments described above and/or illustrated in FIGS. 1-29, 30A, 30B, and 31-34 include respective pluralities of the same components.

In several example embodiments, one or more of the applications, systems, and application programs described above and/or illustrated in FIGS. 1-29, 30A, 30B, and 31-34 include a computer program that includes a plurality of instructions, data, and/or any combination thereof an application written in, for example, Arena, HyperText Markup Language (HTML), Cascading Style Sheets (CSS), JavaScript, Extensible Markup Language (XML), asynchronous JavaScript and XML (Ajax), and/or any combination thereof a web-based application written in, for example, Java or Adobe Flex, which in several example embodiments pulls real-time information from one or more servers, automatically refreshing with latest information at a predetermined time increment; or any combination thereof.

In several example embodiments, a computer system typically includes at least hardware capable of executing machine readable instructions, as well as the software for executing acts (typically machine-readable instructions) that produce a desired result. In several example embodiments, a computer system may include hybrids of hardware and software, as well as computer sub-systems.

In several example embodiments, hardware generally includes at least processor-capable platforms, such as client-machines (also known as personal computers or servers), and hand-held processing devices (such as smart phones, tablet computers, personal digital assistants (PDAs), or personal computing devices (PCDs), for example). In several example embodiments, hardware may include any physical device that is capable of storing machine-readable instructions, such as memory or other data storage devices. In several example embodiments, other forms of hardware include hardware sub-systems, including transfer devices such as modems, modem cards, ports, and port cards, for example.

In several example embodiments, software includes any machine code stored in any memory medium, such as RAM or ROM, and machine code stored on other devices (such as floppy disks, flash memory, or a CD ROM, for example). In several example embodiments, software may include source or object code. In several example embodiments, software encompasses any set of instructions capable of being executed on a node such as, for example, on a client machine or server.

In several example embodiments, combinations of software and hardware could also be used for providing enhanced functionality and performance for certain embodiments of the present disclosure. In an example embodiment, software functions may be directly manufactured into a silicon chip. Accordingly, it should be understood that combinations of hardware and software are also included within the definition of a computer system and are thus envisioned by the present disclosure as possible equivalent structures and equivalent methods.

In several example embodiments, computer readable mediums include, for example, passive data storage, such as a random-access memory (RAM) as well as semi-permanent data storage such as a compact disk read only memory (CD-ROM). One or more example embodiments of the present disclosure may be embodied in the RAM of a computer to transform a standard computer into a new specific computing machine. In several example embodiments, data structures are defined organizations of data that may enable an embodiment of the present disclosure. In an example embodiment, a data structure may provide an organization of data, or an organization of executable code.

In several example embodiments, any networks and/or one or more portions thereof may be designed to work on any specific architecture. In an example embodiment, one or more portions of any networks may be executed on a single computer, local area networks, client-server networks, wide area networks, internets, hand-held and other portable and wireless devices and networks.

In several example embodiments, a database may be any standard or proprietary database software. In several example embodiments, the database may have fields, records, data, and other database elements that may be associated through database specific software. In several example embodiments, data may be mapped. In several example embodiments, mapping is the process of associating one data entry with another data entry. In an example embodiment, the data contained in the location of a character file can be mapped to a field in a second table. In several example embodiments, the physical location of the database is not limiting, and the database may be distributed. In an example embodiment, the database may exist remotely from the server, and run on a separate platform. In an example embodiment, the database may be accessible across the Internet. In several example embodiments, more than one database may be implemented.

In several example embodiments, a plurality of instructions stored on a computer readable medium may be executed by one or more processors to cause the one or more processors to carry out or implement in whole or in part the above-described operation of each of the above-described example embodiments of the system, the method, and/or any combination thereof. In several example embodiments, such a processor may include one or more of the microprocessor 1000*a*, any processors that are part of the components of the system, and/or any combination thereof, and such a computer readable medium may be distributed among one or more components of the system. In several example embodiments, such a processor may execute the plurality of instructions in connection with a virtual computer system. In several example embodiments, such a plurality of instructions may communicate directly with the one or more processors, and/or may interact with one or more operating systems, middleware, firmware, other applications, and/or any combination thereof, to cause the one or more processors to execute the instructions.

The present disclosure introduces a method of using contextual inputs and user inputs associated with an electronic chat session to identify and display information on a graphical user interface of a computer, the method comprising: receiving, by one or more processors, a first user identifier and a first authentication identifier; wherein the first user identifier and the first authentication identifier are associated with a user of the computer gaining direct access to information within a first application; in response to receiving the first user identifier and the first authentication identifier, displaying, on the graphical user interface of the computer, a first window that is associated with the first application; displaying, on the graphical user interface of the computer and simultaneously with the first window, a second window associated with a second application to initiate the electronic chat session; after displaying the first and second windows, receiving by the one or more processors and via the second window, a first user input associated with a first information request; identifying, using the one or more processors and the second application, contextual inputs associated with the electronic session and/or the user; accessing, using the one or more processors and the second application, a third application that is different from each of the first and second applications; identifying, using the one or more processors and the second application, and based on the contextual inputs and the first user input, information relevant to the first information request within the third application; wherein a first response to the first information request is based on the information relevant to the first information request; and displaying, using the one or more processors and the second application, the first response in the second window. In one embodiment, the first application is configured to require receipt, by the one or more processors, of the first user identifier and the first authentication identifier to allow the user to gain direct access to information within the first application; wherein the method further comprises, in response to the receipt of the first user identifier and the first authentication identifier by the one or more processors, the user gaining direct access to the information within the first application; wherein the third application is configured to require receipt, by the one or more processors, of a second user identifier and a second authentication identifier to allow the user to gain direct access to information within the third application; and wherein the second application displays information within the third application on the second window before the one or more processors receives the second user identifier and the second authentication identifier. In one embodiment, the second application displays, in the second window, information within the third application without the user gaining direct access to the third application. In one embodiment, displaying information, in the second window, within the third application without the user gaining direct access to the third application reduces the processing load on the computer. In one embodiment, the first user identifier is associated with a user permission level, and wherein the contextual inputs comprise the user permission level. In one embodiment, the contextual inputs comprise information displayed in the first window that is associated with the first application. In one embodiment, the method also includes receiving, by the one or more processors, a selection of a portion of the information displayed in the first window that is associated with the first application; wherein the contextual inputs comprise the portion of the information displayed in the first window. In one embodiment, further comprising reformatting, using the second application and the one or more processors, the information relevant to the first information request to create the first response to the first information request. In one embodiment, further comprising displaying in the second window, using the one or more processors and the second application, the information relevant to the first information request. In one embodiment, further comprising: after displaying the first and second windows, receiving by the one or more processors, a second user input associated with a second information request; accessing, using the second application, a fourth application that is different from each of the first, second, and third applications; identifying, using the one or more processors and the fourth application, and based on the contextual inputs and the second user input, information relevant to the second information request within the fourth application; and wherein a second response to the second information request is based on the information relevant to the second information request; and displaying, using the one or more processors and the second application, the second response to the second information request in the second window; wherein the contextual inputs further comprise the first user input.

The present disclosure also introduces an apparatus adapted to use contextual inputs and user inputs associated with an electronic chat session to identify and display information on a graphical user interface of a computer, the apparatus comprising: a non-transitory computer readable medium having stored thereon a plurality of instructions, wherein the instructions are executed with at least one processor so that the following steps are executed: receiving, by the at least one processor, a first user identifier and a first authentication identifier; wherein the first user identifier and the first authentication identifier are associated with a user of the computer gaining direct access to information within a first application; in response to receiving the first user identifier and the first authentication identifier, displaying, on the graphical user interface of the computer, a first window that is associated with the first application; displaying, on the graphical user interface of the computer and simultaneously with the first window, a second window associated with a second application to initiate the electronic chat session; after displaying the first and second windows, receiving by the at least one processor and via the second window, a first user input associated with a first information request; identifying, using the at least one processor and the second application, contextual inputs associated with the electronic session and/or the user; accessing, using the at least one processor and the second application, a third application that is different from each of the first and second applications; identifying, using the at least one processor and the second application, and based on the contextual inputs and the first user input, information relevant to the first information request within the third application; wherein a first response to the first information request is based on the information relevant to the first information request; and displaying, using the at least one processor and the second application, the first response in the second window. In one embodiment, the first application is configured to require receipt, by the at least one processor, of the first user identifier and the first authentication identifier to allow the user to gain direct access to information within the first application; wherein the instructions are executed with the at least one processor so that the following additional step is executed: in response to the receipt of the first user identifier and the first authentication identifier by the at least one processor, providing, to the user, direct access to the information within the first application; wherein the third application is configured to require receipt, by the at least one processor, of a second user identifier and a second authentication identifier to allow the user to gain direct access to information within the third application; and wherein the second application displays information within the third application on the second window before the at least one processor receives the second user identifier and the second authentication identifier. In one embodiment, the instructions are executed with the at least one processor so that the following additional step is executed: the second application displays, in the second window, information within the third application without the user gaining direct access to the third application. In one embodiment, the contextual inputs comprise a location of the user. In one embodiment, the first user identifier is associated with a user permission level, and wherein the contextual inputs comprise the user permission level. In one embodiment, the contextual inputs comprise information displayed in the first window that is associated with the first application. In one embodiment, the instructions are executed with the at least one processor so that the following additional step is executed: receiving, by the at least one processor, a selection of a portion of the information displayed in the first window that is associated with the first application; wherein the contextual inputs comprise the portion of the information displayed in the first window. In one embodiment, the instructions are executed with the at least one processor so that the following additional step is executed: reformatting, using the second application and the at least one processor, the information relevant to the first information request to create the first response to the first information request. In one embodiment, the instructions are executed with the at least one processor so that the following additional step is executed: displaying in the second window, using the at least one processor and the second application, the information relevant to the first information request. In one embodiment, the instructions are executed with the at least one processor so that the following additional steps are executed: after displaying the first and second windows, receiving by at the least one processor, a second user input associated with a second information request; accessing, using the second application, a fourth application that is different from each of the first, second, and third applications; identifying, using the at least one processor and the fourth application, and based on the contextual inputs and the second user input, information relevant to the second information request within the fourth application; and wherein a second response to the second information request is based on the information relevant to the second information request; and displaying, using the at least one processor and the second application, the second response to the second information request in the second window; wherein the contextual inputs further comprise the first user input.

In several example embodiments, the elements and teachings of the various illustrative example embodiments may be combined in whole or in part in some or all the illustrative example embodiments. In addition, one or more of the elements and teachings of the various illustrative example embodiments may be omitted, at least in part, and/or combined, at least in part, with one or more of the other elements and teachings of the various illustrative embodiments.

Any spatial references such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several example embodiments, while different steps, processes, and procedures are described as appearing as distinct acts, one or more of the steps, one or more of the processes, and/or one or more of the procedures may also be performed in different orders, simultaneously and/or sequentially. In several example embodiments, the steps, processes and/or procedures may be merged into one or more steps, processes and/or procedures.

In several example embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several example embodiments have been described in detail above, the embodiments described are examples only and are not limiting, and those skilled in the art will readily appreciate that many other modifications, changes and/or substitutions are possible in the example embodiments without materially departing from the novel teachings and advantages of the present disclosure. Accordingly, all such modifications, changes and/or substitutions are intended to be included within the scope of this disclosure as defined in the following claims. In the claims, any means-plus-function clauses are intended to cover the structures described herein as performing the recited function and not only structural equivalents, but also equivalent structures. Moreover, it is the express intention of the applicant not to invoke 35 U.S.C. § 112, paragraph 6 for any limitations of any of the claims herein, except for those in which the claim expressly uses the word "means" together with an associated function.

What we claim is:

1. A method of using contextual inputs and user inputs associated with an electronic chat session to identify and display information on a graphical user interface of a computer, the method comprising:
    receiving, by one or more processors, a first user identifier and a first authentication identifier;
        wherein the first user identifier and the first authentication identifier are associated with a user of the computer gaining direct access to information within a first application;
    in response to receiving the first user identifier and the first authentication identifier, displaying, on the graphical user interface of the computer, a first window that is associated with the first application;
    displaying, on the graphical user interface of the computer and simultaneously with the first window, a second window associated with a second application to initiate the electronic chat session;
    after displaying the first and second windows, receiving by the one or more processors and via the second window, a first user input associated with a first information request;
    identifying, using the one or more processors and the second application, contextual inputs associated with the electronic session and/or the user;
    identifying, using the one or more processors and the second application, a third application from a plurality of applications as having information relevant to the first information request;
        wherein identifying the third application is based on the contextual inputs and the first user input;
    accessing, using the one or more processors and the second application, the third application that is different from each of the first and second applications;
    identifying, using the one or more processors and the second application, and based on the contextual inputs and the first user input, the information relevant to the first information request within the third application;
        wherein a first response to the first information request is based on the information relevant to the first information request; and
    displaying, using the one or more processors and the second application, the first response in the second window.

2. The method of claim 1,
    wherein the first application is configured to require receipt, by the one or more processors, of the first user identifier and the first authentication identifier to allow the user to gain direct access to information within the first application;
    wherein the method further comprises, in response to the receipt of the first user identifier and the first authentication identifier by the one or more processors, the user gaining direct access to the information within the first application;
    wherein the third application is configured to require receipt, by the one or more processors, of a second user identifier and a second authentication identifier to allow the user to gain direct access to information within the third application; and wherein the second application displays information within the third application on the second window before the one or more processors receives the second user identifier and the second authentication identifier.

3. The method of claim 2, wherein the second application displays, in the second window, information within the third application without the user gaining direct access to the third application.

4. The method of claim 3, wherein displaying information, in the second window, within the third application without the user gaining direct access to the third application reduces the processing load on the computer.

5. The method of claim 1, wherein the first user identifier is associated with a user permission level, and wherein the contextual inputs comprise the user permission level.

6. The method of claim 1, wherein the contextual inputs comprise information displayed in the first window that is associated with the first application.

7. The method of claim 1, further comprising receiving, by the one or more processors, a selection of a portion of the information displayed in the first window that is associated with the first application;
wherein the contextual inputs comprise the portion of the information displayed in the first window.

8. The method of claim 1, further comprising reformatting, using the second application and the one or more processors, the information relevant to the first information request to create the first response to the first information request.

9. The method of claim 1, further comprising displaying in the second window, using the one or more processors and the second application, the information relevant to the first information request.

10. The method of claim 1, further comprising:
after displaying the first and second windows, receiving by the one or more processors, a second user input associated with a second information request;
identifying, using the one or more processors and the second application, a fourth application from the plurality of applications as having information relevant to the second information request;
wherein identifying the fourth application is based on the contextual inputs and the second user input;
accessing, using the second application, the fourth application that is different from each of the first, second, and third applications;
identifying, using the one or more processors and the fourth application, and based on the contextual inputs and the second user input, the information relevant to the second information request within the fourth application; and
wherein a second response to the second information request is based on the information relevant to the second information request; and
displaying, using the one or more processors and the second application, the second response to the second information request in the second window;
wherein the contextual inputs further comprise the first user input.

11. An apparatus adapted to use contextual inputs and user inputs associated with an electronic chat session to identify and display information on a graphical user interface of a computer, the apparatus comprising:
a non-transitory computer readable medium having stored thereon a plurality of instructions, wherein the instructions are executed with at least one processor so that the following steps are executed:
receiving, by the at least one processor, a first user identifier and a first authentication identifier;
wherein the first user identifier and the first authentication identifier are associated with a user of the computer gaining direct access to information within a first application;
in response to receiving the first user identifier and the first authentication identifier, displaying, on the graphical user interface of the computer, a first window that is associated with the first application;
displaying, on the graphical user interface of the computer and simultaneously with the first window, a second window associated with a second application to initiate the electronic chat session;
after displaying the first and second windows, receiving by the at least one processor and via the second window, a first user input associated with a first information request;
identifying, using the at least one processor and the second application, contextual inputs associated with the electronic session and/or the user;
identifying, using the at least one processor and the second application, a third application from a plurality of applications as having information relevant to the first information request;
wherein identifying the third application is based on the contextual inputs and the first user input;
accessing, using the at least one processor and the second application, the third application that is different from each of the first and second applications;
identifying, using the at least one processor and the second application, and based on the contextual inputs and the first user input, the information relevant to the first information request within the third application;
wherein a first response to the first information request is based on the information relevant to the first information request; and
displaying, using the at least one processor and the second application, the first response in the second window.

12. The apparatus of claim 11,
wherein the first application is configured to require receipt, by the at least one processor, of the first user identifier and the first authentication identifier to allow the user to gain direct access to information within the first application;
wherein the instructions are executed with the at least one processor so that the following additional step is executed:
in response to the receipt of the first user identifier and the first authentication identifier by the at least one processor, providing, to the user, direct access to the information within the first application;
wherein the third application is configured to require receipt, by the at least one processor, of a second user identifier and a second authentication identifier to allow the user to gain direct access to information within the third application; and
wherein the second application displays information within the third application on the second window before the at least one processor receives the second user identifier and the second authentication identifier.

13. The apparatus of claim 12, wherein the instructions are executed with the at least one processor so that the following additional step is executed:
   the second application displays, in the second window, information within the third application without the user gaining direct access to the third application.

14. The apparatus of claim 13, wherein the contextual inputs comprise a location of the user.

15. The apparatus of claim 11, wherein the first user identifier is associated with a user permission level, and wherein the contextual inputs comprise the user permission level.

16. The apparatus of claim 11, wherein the contextual inputs comprise information displayed in the first window that is associated with the first application.

17. The apparatus of claim 11, wherein the instructions are executed with the at least one processor so that the following additional step is executed:
   receiving, by the at least one processor, a selection of a portion of the information displayed in the first window that is associated with the first application;
   wherein the contextual inputs comprise the portion of the information displayed in the first window.

18. The apparatus of claim 11, wherein the instructions are executed with the at least one processor so that the following additional step is executed:
   reformatting, using the second application and the at least one processor, the information relevant to the first information request to create the first response to the first information request.

19. The apparatus of claim 11, wherein the instructions are executed with the at least one processor so that the following additional step is executed:
   displaying in the second window, using the at least one processor and the second application, the information relevant to the first information request.

20. The apparatus of claim 11, wherein the instructions are executed with the at least one processor so that the following additional steps are executed:
   after displaying the first and second windows, receiving by at the least one processor, a second user input associated with a second information request;
   identifying, using the least one processor and the second application, a fourth application from the plurality of applications as having information relevant to the second information request;
   wherein identifying the fourth application is based on the contextual inputs and the second user input;
   accessing, using the second application, the fourth application that is different from each of the first, second, and third applications;
   identifying, using the at least one processor and the fourth application, and based on the contextual inputs and the second user input, the information relevant to the second information request within the fourth application; and
   wherein a second response to the second information request is based on the information relevant to the second information request; and
   displaying, using the at least one processor and the second application, the second response to the second information request in the second window;
   wherein the contextual inputs further comprise the first user input.

* * * * *